United States Patent
Durocher et al.

(10) Patent No.: US 9,803,317 B2
(45) Date of Patent: Oct. 31, 2017

(54) METHOD OF DIGESTING LIGNOCELLULOSIC MATERIAL

(71) Applicant: BASF SE, Ludwigshafen (DE)

(72) Inventors: David Durocher, Westland, MI (US); Thomas C. Friel, Saint Johns, FL (US); Kenneth L. Zack, Wyandotte, MI (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/377,610

(22) PCT Filed: Feb. 8, 2013

(86) PCT No.: PCT/US2013/025379
§ 371 (c)(1),
(2) Date: Aug. 8, 2014

(87) PCT Pub. No.: WO2013/119977
PCT Pub. Date: Aug. 15, 2013

(65) Prior Publication Data
US 2015/0007809 A1  Jan. 8, 2015

Related U.S. Application Data

(60) Provisional application No. 61/596,904, filed on Feb. 9, 2012.

(51) Int. Cl.
*D21C 5/00* (2006.01)
*C08H 8/00* (2010.01)
*D21C 3/02* (2006.01)
*D21C 3/22* (2006.01)
*D21C 3/24* (2006.01)

(52) U.S. Cl.
CPC ............... *D21C 5/00* (2013.01); *C08H 8/00* (2013.01); *D21C 3/02* (2013.01); *D21C 3/222* (2013.01); *D21C 3/24* (2013.01)

(58) Field of Classification Search
CPC ...................................................... D21C 5/00
See application file for complete search history.

(56) References Cited

U.S. PATENT DOCUMENTS

| | | | |
|---|---|---|---|
| 4,426,254 A | 1/1984 | Wood et al. | |
| 5,250,152 A | 10/1993 | Ling et al. | |
| 5,542,950 A * | 8/1996 | Cole | B01D 19/0404 510/303 |
| 5,728,265 A * | 3/1998 | Saint Victor | D21C 3/222 162/72 |
| 5,779,856 A * | 7/1998 | Kettunen | D21C 3/02 162/19 |
| 6,551,452 B2 | 4/2003 | Wai et al. | |
| 6,649,023 B1 | 11/2003 | Wai et al. | |
| 7,671,006 B2 | 3/2010 | Company et al. | |
| 2004/0231060 A1 * | 11/2004 | Burdette | C12N 9/0006 8/115.51 |
| 2009/0076299 A1 * | 3/2009 | Company | A01N 25/30 562/20 |
| 2009/0163619 A1 * | 6/2009 | Hsu | C08F 220/18 523/335 |

FOREIGN PATENT DOCUMENTS

| | | |
|---|---|---|
| GB | 1294073 | * 10/1972 |
| WO | WO 2011112703 A2 | 9/2011 |

OTHER PUBLICATIONS

Product Bulletin—Benefits of Glucopon Types in hard surface Cleaning CareChemical, pp. 1-44, 2005.*
International Search Report for PCT/US2013/025379 dated Jul. 16, 2013, 3 pages.

* cited by examiner

*Primary Examiner* — Douglas B Call
(74) *Attorney, Agent, or Firm* — Howard & Howard Attorneys PLLC

(57) ABSTRACT

A method of digesting lignocellulosic material includes the steps of providing the lignocellulosic material and a caustic composition having a pH of at least about 10. The caustic composition includes water, an alkaline- or alkaline earth-metal hydroxide, and up to about 1 percent by weight based on a total weight of the composition of a branched digestion additive. The branched digestion additive has the structure: wherein A is at least one alkyleneoxy group and each alkyleneoxy group has from 2 to 4 carbon atoms, n is 0 or 1, B is a branched aliphatic hydrocarbon group having from 8 to 15 carbon atoms, X is H or $B\text{-}O\text{-}(A)_m$, and each m is independently an average value from 3 to 30, and wherein the caustic composition has a Draves Wetting Time of less than 100 seconds as determined using ASTM D2281.

(I)

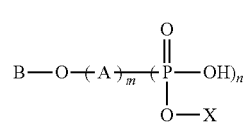

21 Claims, 20 Drawing Sheets

TABLE 1

| Composition | Commercial Name of Additive | Temp. of Comp. (°C) During Testing | Weight % NaOH | Weight % Additive | Average Wetting Time | Appearance |
|---|---|---|---|---|---|---|
| Composition 1 | Lutensol XP100 | 50 | 5 | 0.2 | 2.3 | Hazy |
| Composition 2 | Lutensol TDA10 | 50 | 5 | 0.2 | 2.6 | Hazy |
| Composition 3 | Lutensol TDA10 | 50 | 3 | 0.3 | 2.7 | Clear |
| Composition 4 | Lutensol XP140 | 50 | 4 | 0.2 | 3.3 | Clear |
| Composition 5 | Lutensol XP140 | 50 | 3 | 0.3 | 3.4 | Clear |
| Composition 6 | Lutensol XP140 | 50 | 5 | 0.2 | 4.3 | Clear |
| Composition 7 | Lutensol XP40 PE | 70 | 7 | 0.2 | 4.8 | Hazy |
| Composition 8 | Lutensol XL50 PE | 70 | 7 | 0.2 | 4.8 | Clear |
| Composition 9 | Lutensol XP50 PE | 70 | 7 | 0.2 | 5.1 | Clear |
| Composition 10 | Lutensol XL70 PE | 70 | 7 | 0.2 | 6.8 | Clear |
| Composition 11 | TDA 3 PE | 70 | 7 | 0.2 | 6.9 | Hazy |
| Composition 12 | TDA 3 PE | 60 | 6 | 0.2 | 7.2 | Hazy |
| Composition 13 | TDA 3 PE | 70 | 7 | 0.2 | 8.7 | Hazy |
| Composition 14 | Exal 8 390 PEG PE | 60 | 6 | 0.2 | 15.9 | Hazy |
| Composition 15 | TDA 3 PE | 60 | 7 | 0.2 | 23.1 | Hazy |
| Composition 16 | Lutensol XP70 w Dexiphat 160C | 70 | 7 | 0.2 | 25.8 | Hazy |
| Composition 17 | Lutensol TDA10 | 50 | 4 | 0.2 | 28.7 | Cloudy |
| Composition 18 | TDA 3 PE | 70 | 7 | 0.2 | 40.6 | Hazy |
| Composition 19 | Pluafac LF131 | 50 | 5 | 0.2 | 42.4 | Cloudy |
| Composition 20 | Maphos M36 PE | 50 | 5 | 0.2 | 58.9 | Clear |
| Composition 21 | Maphos M36 PE | 60 | 6 | 0.2 | 86.7 | Clear |
| Composition 22 | Maphos M36 PE | 50 | 5 | 0.2 | 88.0 | Clear |
| Composition 23 | Lutensol XP140 | 60 | 6 | 0.2 | 89.1 | Hazy |
| Composition 24 | Maphos M36 PE | 70 | 7 | 0.2 | 102.3 | Hazy |
| Composition 25 | Lutensol TDA10 | 60 | 5 | 0.2 | 135.7 | Cloudy |
| Composition 26 | Lutensol TDA10 0.1% Dowfax 2A1 | 70 | 7 | 0.2 | 149.9 | Hazy |
| Composition 27 | Lutensol XP70 | 70 | 7 | 0.2 | 355.8 | Hazy |
| Composition 28 | Lutensol XL80 | 70 | 7 | 0.2 | 543.0 | Hazy |
| Composition 29 | Lutensol XP100 | 70 | 9 | 0.1 | 947.0 | Cloudy |
| Composition 30 | Iconol TDA8 | 70 | 7 | 0.2 | >600 | Hazy |
| Composition 31 | Lutensol TDA10 | 70 | 9 | 0.1 | >600 | Cloudy |
| Composition 32 | TDA 3 | 70 | 7 | 0.2 | >600 | Hazy |
| Composition 33 | Lutensol XP40 | 70 | 7 | 0.2 | >600 | Hazy |
| Composition 34 | Lutensol XP50 | 70 | 7 | 0.2 | >600 | Hazy |
| Composition 35 | Lutensol XL50 | 70 | 7 | 0.2 | >600 | Hazy |
| Composition 36 | Lutensol XL70 | 70 | 7 | 0.2 | >600 | Hazy |
| Composition 37 | Lutensol TO5 PE | 70 | 9 | 0.2 | 11.2 | Hazy |
| Composition 38 | Lutensol TO5 | 70 | 7 | 0.2 | 504.5 | Hazy |
| Composition 39 | Lutensol TO5 PE | 70 | 7 | 0.2 | 7.7 | Hazy |
| Composition 40 | Lutensol XP90 PE | 70 | 9 | 0.2 | 7 | Clear |
| Comparative Composition 1 | Mazon 40 | 50 | 5 | 0.2 | 16.5 | Clear Brown |
| Comparative Composition 2 | Glucopon 600UP | 70 | 7 | 0.2 | 17.8 | Clear |
| Comparative Composition 3 | Lutensol A12N | 50 | 4 | 0.2 | 19.2 | Clear |
| Comparative Composition 4 | Lutensol GD70 | 60 | 6 | 0.2 | 20.2 | Clear Yellow |

Figure 1

| Composition | Commercial Name of Additive | Temp. of Comp. (°C) During Testing | Weight % NaOH | Weight % Additive | Average Wetting Time | Appearance |
|---|---|---|---|---|---|---|
| Comparative Composition 5 | Lutensol A12N | 50 | 3 | 0.3 | 20.4 | Clear |
| Comparative Composition 6 | Lutensol GD70 | 70 | 7 | 0.2 | 24.4 | Clear |
| Comparative Composition 7 | Mazon 40 | 60 | 6 | 0.2 | 26.6 | Clear Brown |
| Comparative Composition 8 | Mazon 40 | 70 | 7 | 0.2 | 32.5 | Clear |
| Comparative Composition 9 | Mazon 40 | 60 | 6 | 0.2 | 32.9 | Clear Brown |
| Comparative Composition 10 | Mazon 40 | 50 | 6 | 0.2 | 35.1 | Clear Brown |
| Comparative Composition 11 | Glucapon 425 | 60 | 6 | 0.2 | 36.2 | Clear |
| Comparative Composition 12 | Lutensol A12N | 50 | 5 | 0.2 | 37.1 | Clear |
| Comparative Composition 13 | Lutensol A12N | 60 | 5 | 0.2 | 41.5 | Cloudy |
| Comparative Composition 14 | Strodex KM0VOC | 50 | 5 | 0.2 | 48.5 | Cloudy |
| Comparative Composition 15 | Maphos M60 PE | 50 | 5 | 0.2 | 63.4 | Clear |
| Comparative Composition 16 | Pluronic P65 PE | 50 | 5 | 0.2 | 76.5 | Clear |
| Comparative Composition 17 | Lutensol OP10 | 50 | 6 | 0.2 | 92.2 | Cloudy |
| Comparative Composition 18 | Tetronic 90R4 PE | 60 | 6 | 0.2 | 92.5 | Hazy |
| Comparative Composition 19 | Maphos M60 PE | 50 | 5 | 0.2 | 100.3 | Clear |
| Comparative Composition 20 | Lutensol A12N | 60 | 6 | 0.2 | 101.1 | Hazy |
| Comparative Composition 21 | Maphos M60 PE | 60 | 6 | 0.2 | 114.2 | Clear |
| Comparative Composition 22 | Tetronic 304 | 60 | 6 | 0.2 | 115.9 | Hazy |
| Comparative Composition 23 | Pluronic P65 PE | 60 | 6 | 0.2 | 250.7 | Clear |
| Comparative Composition 24 | Lutensol A12N | 70 | 9 | 0.1 | 630.5 | Cloudy |
| Comparative Composition 25 | Dephat 160C 0.2% Active | 70 | 7 | 0.2 | >600 | Clear |
| Comparative Composition 26 | Lutensol A12N PE | 50 | 5 | 0.2 | >600 | Clear |
| Comparative Composition 27 | Lutensol A12N PE | 50 | 5 | 0.2 | >600 | Clear |
| Comparative Composition 28 | Maphos 66H | 50 | 6 | 0.2 | >600 | Clear |
| Comparative Composition 29 | Maphos 8135 | 50 | 6 | 0.2 | >600 | Hazy |
| Comparative Composition 30 | 2PH PE | 70 | 7 | 0.2 | INS | Hazy |
| Comparative | Klearfac AA270 PE | 50 | 5 | 0.2 | >600 | Clear |

Figure 1 (continued)

| Composition | Commercial Name of Additive | Temp. of Comp. (°C) During Testing | Weight % NaOH | Weight % Additive | Average Wetting Time | Appearance |
|---|---|---|---|---|---|---|
| Composition 31 | | | | | | |
| Comparative Composition 32 | Klearfac AA270 PE | 50 | 5 | 0.3 | >600 | Clear |

Figure 1 (continued)

TABLE 2

| Composition | Commercial Name of Additive | Temp. of Comp. (°C) During Testing | Weight % NaOH | Weight % Additive | Average Wetting Time | Appearance |
|---|---|---|---|---|---|---|
| Composition 1 | Lutensol XP100 | 50 | 5 | 0.2 | 2.3 | Hazy |
| Composition 2 | Lutensol TDA10 | 50 | 5 | 0.2 | 2.6 | Hazy |
| Composition 3 | Lutensol TDA10 | 50 | 3 | 0.3 | 2.7 | Clear |
| Composition 4 | Lutensol XP140 | 50 | 4 | 0.2 | 3.3 | Clear |
| Composition 5 | Lutensol XP140 | 50 | 3 | 0.3 | 3.4 | Clear |
| Composition 6 | Lutensol XP140 | 50 | 5 | 0.2 | 4.3 | Clear |
| Composition 7 | Lutensol XP40 PE | 70 | 7 | 0.2 | 4.8 | Hazy |
| Composition 8 | Lutensol XL50 PE | 70 | 7 | 0.2 | 4.8 | Clear |
| Composition 9 | Lutensol XP50 PE | 70 | 7 | 0.2 | 5.1 | Clear |
| Composition 10 | Lutensol XL70 PE | 70 | 7 | 0.2 | 6.8 | Clear |
| Composition 11 | TDA 3 PE | 70 | 7 | 0.2 | 6.9 | Hazy |
| Composition 12 | TDA 3 PE | 60 | 6 | 0.2 | 7.2 | Hazy |
| Composition 39 | Lutensol TO5 PE | 70 | 7 | 0.2 | 7.7 | Hazy |
| Composition 40 | Lutensol XP50 PE | 70 | 9 | 0.2 | 7 | Clear |
| Composition 13 | TDA 3 PE | 70 | 7 | 0.2 | 8.7 | Hazy |
| Composition 37 | Lutensol TO5 PE | 70 | 9 | 0.2 | 11.2 | Hazy |
| Composition 14 | Exal 8 300 PEG PE | 60 | 6 | 0.2 | 15.9 | Hazy |
| Comparative Composition 1 | Mazon 40 | 50 | 5 | 0.2 | 16.5 | Clear Brown |
| Comparative Composition 2 | Glucopon 600UP | 70 | 7 | 0.2 | 17.8 | Clear |
| Comparative Composition 3 | Lutensol A12N | 50 | 4 | 0.2 | 19.2 | Clear |
| Comparative Composition 4 | Lutensol GD70 | 60 | 6 | 0.2 | 20.2 | Clear Yellow |
| Comparative Composition 5 | Lutensol A12N | 50 | 3 | 0.3 | 20.4 | Clear |
| Composition 15 | TDA 3 PE | 60 | 7 | 0.2 | 23.1 | Hazy |
| Comparative Composition 6 | Lutensol GD70 | 70 | 7 | 0.2 | 24.4 | Clear |
| Composition 16 | Lutensol XP70 w Deriphat 160C | 70 | 7 | 0.2 | 25.8 | Hazy |
| Comparative Composition 7 | Mazon 40 | 60 | 6 | 0.2 | 26.6 | Clear Brown |
| Composition 17 | Lutensol TDA10 | 50 | 4 | 0.2 | 28.7 | Cloudy |
| Comparative Composition 8 | Mazon 40 | 70 | 7 | 0.2 | 32.5 | Clear |
| Comparative Composition 9 | Mazon 40 | 60 | 6 | 0.2 | 32.9 | Clear Brown |
| Comparative Composition 10 | Mazon 40 | 50 | 6 | 0.2 | 35.1 | Clear Brown |
| Comparative Composition 11 | Glucapon 425 | 60 | 6 | 0.2 | 36.2 | Clear |
| Comparative Composition 12 | Lutensol A12N | 50 | 5 | 0.2 | 37.1 | Clear |
| Composition 18 | TDA 3 PE | 70 | 7 | 0.2 | 40.6 | Hazy |
| Comparative Composition 13 | Lutensol A12N | 60 | 5 | 0.2 | 41.5 | Cloudy |
| Composition 19 | Plurafac LF131 | 50 | 5 | 0.2 | 42.4 | Cloudy |
| Comparative Composition 14 | Strodex KM0VOC | 50 | 5 | 0.2 | 48.5 | Cloudy |

Figure 2

| Composition | Commercial Name of Additive | Temp. of Comp. (°C) During Testing | Weight % NaOH | Weight % Additive | Average Wetting Time | Appearance |
|---|---|---|---|---|---|---|
| Composition 20 | Maphos M36 PE | 50 | 5 | 0.2 | 58.9 | Clear |
| Comparative Composition 15 | Maphos M60 PE | 50 | 5 | 0.2 | 63.4 | Clear |
| Comparative Composition 16 | Pluronic P65 PE | 50 | 5 | 0.2 | 76.5 | Clear |
| Composition 21 | Maphos M36 PE | 60 | 6 | 0.2 | 86.7 | Clear |
| Composition 22 | Maphos M36 PE | 50 | 5 | 0.2 | 88.0 | Clear |
| Composition 23 | Lutensol XP140 | 60 | 6 | 0.2 | 89.1 | Hazy |
| Comparative Composition 17 | Lutensol OP10 | 50 | 6 | 0.2 | 92.2 | Cloudy |
| Comparative Composition 18 | Tetronic 90R4 PE | 60 | 6 | 0.2 | 92.5 | Hazy |
| Comparative Composition 19 | Maphos M60 PE | 50 | 5 | 0.2 | 100.3 | Clear |
| Comparative Composition 20 | Lutensol A12N | 60 | 6 | 0.2 | 101.1 | Hazy |
| Composition 24 | Maphos M36 PE | 70 | 7 | 0.2 | 102.3 | Hazy |
| Comparative Composition 21 | Maphos M60 PE | 60 | 6 | 0.2 | 114.2 | Clear |
| Comparative Composition 22 | Tetronic 304 | 60 | 6 | 0.2 | 115.9 | Hazy |
| Composition 25 | Lutensol TDA10 | 60 | 5 | 0.2 | 135.7 | Cloudy |
| Composition 26 | Lutensol TDA10 and 0.1% Dowfax 2A1 | 70 | 7 | 0.2 | 149.9 | Hazy |
| Comparative Composition 23 | Pluronic P65 PE | 60 | 6 | 0.2 | 250.7 | Clear |
| Composition 27 | Lutensol XP70 | 70 | 7 | 0.2 | 355.8 | Hazy |
| Composition 38 | Lutensol TO5 | 70 | 7 | 0.2 | 504.5 | Hazy |
| Composition 28 | Lutensol XL80 | 70 | 7 | 0.2 | 543.0 | Hazy |
| Composition 30 | Iconol TDA8 | 70 | 7 | 0.2 | >600 | Hazy |
| Comparative Composition 31 | Klearfac AA270 PE | 50 | 5 | 0.2 | >600 | Clear |
| Comparative Composition 32 | Klearfac AA270 PE | 50 | 5 | 0.3 | >600 | Clear |
| Composition 31 | Lutensol TDA10 | 70 | 9 | 0.1 | >600 | Cloudy |
| Composition 32 | TDA 3 | 70 | 7 | 0.2 | >600 | Hazy |
| Composition 33 | Lutensol XP40 | 70 | 7 | 0.2 | >600 | Hazy |
| Composition 34 | Lutensol XP50 | 70 | 7 | 0.2 | >600 | Hazy |
| Composition 35 | Lutensol XL50 | 70 | 7 | 0.2 | >600 | Hazy |
| Composition 36 | Lutensol XL70 | 70 | 7 | 0.2 | >600 | Hazy |
| Comparative Composition 25 | Deriphat 160C 0.2% Active | 70 | 7 | 0.2 | >600 | Clear |
| Comparative Composition 26 | Lutensol A12N PE | 50 | 5 | 0.2 | >600 | Clear |
| Comparative Composition 27 | Lutensol A12N PE | 50 | 5 | 0.2 | >600 | Clear |
| Comparative Composition 28 | Maphos 66H | 50 | 6 | 0.2 | >600 | Clear |
| Comparative Composition 29 | Maphos 8135 | 50 | 6 | 0.2 | >600 | Hazy |
| Comparative Composition 24 | Lutensol A12N | 70 | 9 | 0.1 | 630.5 | Cloudy |

Figure 2 (continued)

| Composition | Commercial Name of Additive | Temp. of Comp. (°C) During Testing | Weight % NaOH | Weight % Additive | Average Wetting Time | Appearance |
|---|---|---|---|---|---|---|
| Composition 29 | Lutensol XP100 | 70 | 9 | 0.1 | 947.0 | Cloudy |
| Comparative Composition 30 | 2PH PE | 70 | 7 | 0.2 | DNS | Hazy |

Figure 2 (continued)

TABLE 3A

| Composition | Commercial Name of Additive | Temp. of Comp. (°C) During Testing | Weight % NaOH | Weight % Additive | Average Wetting Time | Appearance |
|---|---|---|---|---|---|---|
| Composition 1 | Lutensol XP100 | 50 | 5 | 0.2 | 2.3 | Hazy |
| Composition 2 | Lutensol TDA10 | 50 | 5 | 0.2 | 2.6 | Hazy |
| Composition 3 | Lutensol TDA10 | 50 | 3 | 0.3 | 2.7 | Clear |
| Composition 4 | Lutensol XP140 | 50 | 4 | 0.2 | 3.3 | Clear |
| Composition 5 | Lutensol XP140 | 50 | 3 | 0.3 | 3.4 | Clear |
| Composition 6 | Lutensol XP140 | 50 | 5 | 0.2 | 4.3 | Clear |
| Comparative Composition 1 | Mazon 40 | 50 | 5 | 0.2 | 16.5 | Clear Brown |
| Comparative Composition 3 | Lutensol A12N | 50 | 4 | 0.2 | 19.2 | Clear |
| Comparative Composition 5 | Lutensol A12N | 50 | 3 | 0.3 | 20.4 | Clear |
| Composition 17 | Lutensol TDA10 | 50 | 4 | 0.2 | 28.7 | Cloudy |
| Comparative Composition 10 | Mazon 40 | 50 | 6 | 0.2 | 35.1 | Clear Brown |
| Comparative Composition 12 | Lutensol A12N | 50 | 5 | 0.2 | 37.1 | Clear |
| Composition 19 | Plurafac LF131 | 50 | 5 | 0.2 | 42.4 | Cloudy |
| Comparative Composition 14 | Strodex KM0VOC | 50 | 5 | 0.2 | 48.5 | Cloudy |
| Composition 20 | Maphos M36 PE | 50 | 5 | 0.2 | 58.9 | Clear |
| Comparative Composition 15 | Maphos M60 PE | 50 | 5 | 0.2 | 63.4 | Clear |
| Comparative Composition 16 | Pluronic P65 PE | 50 | 5 | 0.2 | 76.5 | Clear |
| Composition 22 | Maphos M36 PE | 50 | 5 | 0.2 | 88.0 | Clear |
| Comparative Composition 17 | Lutensol OP10 | 50 | 6 | 0.2 | 92.2 | Cloudy |
| Comparative Composition 19 | Maphos M60 PE | 50 | 5 | 0.2 | 100.3 | Clear |
| Comparative Composition 31 | Klearfac AA270 PE | 50 | 5 | 0.2 | >600 | Clear |
| Comparative Composition 32 | Klearfac AA270 PE | 50 | 5 | 0.3 | >600 | Clear |
| Comparative Composition 26 | Lutensol A12N PE | 50 | 5 | 0.2 | >600 | Clear |
| Comparative Composition 27 | Lutensol A12N PE | 50 | 5 | 0.2 | >600 | Clear |
| Comparative Composition 28 | Maphos 66H | 50 | 6 | 0.2 | >600 | Clear |
| Comparative Composition 29 | Maphos 8135 | 50 | 6 | 0.2 | >600 | Hazy |

*Figure 3A*

TABLE 3B

| Composition | Commercial Name of Additive | Temp. of Comp. (°C) During Testing | Weight % NaOH | Weight % Additive | Average Wetting Time | Appearance |
|---|---|---|---|---|---|---|
| Composition 12 | TDA 3 PE | 60 | 6 | 0.2 | 7.2 | Hazy |
| Composition 14 | Exal 8 300 PEG PE | 60 | 6 | 0.2 | 15.9 | Hazy |
| Comparative Composition 4 | Lutensol GD70 | 60 | 6 | 0.2 | 20.2 | Clear Yellow |
| Composition 15 | TDA 3 PE | 60 | 7 | 0.2 | 23.1 | Hazy |
| Comparative Composition 7 | Mazon 40 | 60 | 6 | 0.2 | 26.6 | Clear Brown |
| Comparative Composition 9 | Mazon 40 | 60 | 6 | 0.2 | 32.9 | Clear Brown |
| Comparative Composition 11 | Glucapon 425 | 60 | 6 | 0.2 | 36.2 | Clear |
| Comparative Composition 13 | Lutensol A12N | 60 | 5 | 0.2 | 41.5 | Cloudy |
| Composition 21 | Maphos M36 PE | 60 | 6 | 0.2 | 86.7 | Clear |
| Composition 23 | Lutensol XP140 | 60 | 6 | 0.2 | 89.1 | Hazy |
| Comparative Composition 18 | Tetronic 90R4 PE | 60 | 6 | 0.2 | 92.5 | Hazy |
| Comparative Composition 20 | Lutensol A12N | 60 | 6 | 0.2 | 101.1 | Hazy |
| Comparative Composition 21 | Maphos M60 PE | 60 | 6 | 0.2 | 114.2 | Clear |
| Comparative Composition 22 | Tetronic 304 | 60 | 6 | 0.2 | 115.9 | Hazy |
| Composition 25 | Lutensol TDA10 | 60 | 5 | 0.2 | 135.7 | Cloudy |
| Comparative Composition 23 | Pluronic P65 PE | 60 | 6 | 0.2 | 250.7 | Clear |

*Figure 3B*

TABLE 3C

| Composition | Commercial Name of Additive | Temp. of Comp. (°C) During Testing | Weight % NaOH | Weight % Additive | Average Wetting Time | Appearance |
|---|---|---|---|---|---|---|
| Comparative Composition 30 | 2PH PE | 70 | 7 | 0.2 | INS | Hazy |
| Composition 7 | Lutensol XP40 PE | 70 | 7 | 0.2 | 4.8 | Hazy |
| Composition 8 | Lutensol XL50 PE | 70 | 7 | 0.2 | 4.8 | Clear |
| Composition 9 | Lutensol XP50 PE | 70 | 7 | 0.2 | 5.1 | Clear |
| Composition 10 | Lutensol XL70 PE | 70 | 7 | 0.2 | 6.8 | Clear |
| Composition 11 | TDA 3 PE | 70 | 7 | 0.2 | 6.9 | Hazy |
| Composition 40 | Lutensol XP90 PE | 70 | 9 | 0.2 | 7 | Clear |
| Composition 39 | Lutensol TO5 PE | 70 | 7 | 0.2 | 7.7 | Hazy |
| Composition 13 | TDA 3 PE | 70 | 7 | 0.2 | 8.7 | Hazy |
| Composition 37 | Lutensol TO5 PE | 70 | 9 | 0.2 | 11.2 | Hazy |
| Comparative Composition 2 | Glucopon 600UP | 70 | 7 | 0.2 | 17.8 | Clear |
| Comparative Composition 6 | Lutensol GD70 | 70 | 7 | 0.2 | 24.4 | Clear |
| Composition 16 | Lutensol XP70 w Deriphat 160C | 70 | 7 | 0.2 | 25.8 | Hazy |
| Comparative Composition 8 | Mazon 40 | 70 | 7 | 0.2 | 32.5 | Clear |
| Composition 18 | TDA 3 PE | 70 | 7 | 0.2 | 40.6 | Hazy |
| Composition 24 | Maphos M36 PE | 70 | 7 | 0.2 | 102.3 | Hazy |
| Composition 26 | Lutensol TDA10 and 0.1% Dowfax 2A1 | 70 | 7 | 0.2 | 149.9 | Hazy |
| Composition 27 | Lutensol XP70 | 70 | 7 | 0.2 | 355.8 | Hazy |
| Composition 38 | Lutensol TO5 | 70 | 7 | 0.2 | 504.5 | Hazy |
| Composition 28 | Lutensol XL80 | 70 | 7 | 0.2 | 543.0 | Hazy |
| Composition 30 | Iconol TDA8 | 70 | 7 | 0.2 | >600 | Hazy |
| Composition 31 | Lutensol TDA10 | 70 | 9 | 0.1 | >600 | Cloudy |
| Composition 32 | TDA 3 | 70 | 7 | 0.2 | >600 | Hazy |
| Composition 33 | Lutensol XP40 | 70 | 7 | 0.2 | >600 | Hazy |
| Composition 34 | Lutensol XP50 | 70 | 7 | 0.2 | >600 | Hazy |
| Composition 35 | Lutensol XL50 | 70 | 7 | 0.2 | >600 | Hazy |
| Composition 36 | Lutensol XL70 | 70 | 7 | 0.2 | >600 | Hazy |
| Comparative Composition 25 | Deriphat 160C 0.2% Active | 70 | 7 | 0.2 | >600 | Clear |
| Comparative Composition 24 | Lutensol A12N | 70 | 9 | 0.1 | 630.5 | Cloudy |
| Composition 29 | Lutensol XP100 | 70 | 9 | 0.1 | 947.0 | Cloudy |

*Figure 3C*

TABLE 4A

| Composition | Commercial Name of Additive | Temp. of Comp. (°C) During Testing | Weight % NaOH | Weight % Additive | Average Wetting Time | Appearance |
|---|---|---|---|---|---|---|
| Composition 31 | Lutensol TDA10 | 70 | 9 | 0.1 | >600 | Cloudy |
| Comparative Composition 24 | Lutensol A12N | 70 | 9 | 0.1 | 630.5 | Cloudy |
| Composition 29 | Lutensol XP100 | 70 | 9 | 0.1 | 947.0 | Cloudy |

Figure 4A

TABLE 4B

| Composition | Commercial Name of Additive | Temp. of Comp. (°C) During Testing | Weight % NaOH | Weight % Additive | Average Wetting Time | Appearance |
|---|---|---|---|---|---|---|
| Composition 1 | Lutensol XP100 | 50 | 5 | 0.2 | 2.3 | Hazy |
| Composition 2 | Lutensol TDA10 | 50 | 5 | 0.2 | 2.6 | Hazy |
| Composition 4 | Lutensol XP140 | 50 | 4 | 0.2 | 3.3 | Clear |
| Composition 6 | Lutensol XP140 | 50 | 5 | 0.2 | 4.3 | Clear |
| Composition 7 | Lutensol XP40 PE | 70 | 7 | 0.2 | 4.8 | Hazy |
| Composition 8 | Lutensol XL50 PE | 70 | 7 | 0.2 | 4.8 | Clear |
| Composition 9 | Lutensol XP50 PE | 70 | 7 | 0.2 | 5.1 | Clear |
| Composition 10 | Lutensol XL70 PE | 70 | 7 | 0.2 | 6.8 | Clear |
| Composition 11 | TDA 3 PE | 70 | 7 | 0.2 | 6.9 | Hazy |
| Composition 40 | Lutensol XP90 PE | 70 | 9 | 0.2 | 7 | Clear |
| Composition 12 | TDA 3 PE | 60 | 6 | 0.2 | 7.2 | Hazy |
| Composition 39 | Lutensol TO5 PE | 70 | 7 | 0.2 | 7.7 | Hazy |
| Composition 13 | TDA 3 PE | 70 | 7 | 0.2 | 8.7 | Hazy |
| Composition 37 | Lutensol TO5 PE | 70 | 9 | 0.2 | 11.2 | Hazy |
| Composition 14 | Exal 8 300 PEG PE | 60 | 6 | 0.2 | 15.9 | Hazy |
| Comparative Composition 1 | Mazon 40 | 50 | 5 | 0.2 | 16.5 | Clear Brown |
| Comparative Composition 2 | Glucopon 600UP | 70 | 7 | 0.2 | 17.8 | Clear |
| Comparative Composition 3 | Lutensol A12N | 50 | 4 | 0.2 | 19.2 | Clear |
| Comparative Composition 4 | Lutensol GD70 | 60 | 6 | 0.2 | 20.2 | Clear Yellow |
| Composition 15 | TDA 3 PE | 60 | 7 | 0.2 | 23.1 | Hazy |
| Comparative Composition 6 | Lutensol GD70 | 70 | 7 | 0.2 | 24.4 | Clear |
| Composition 16 | Lutensol XP70 w Deriphat 160C | 70 | 7 | 0.2 | 25.8 | Hazy |
| Comparative Composition 7 | Mazon 40 | 60 | 6 | 0.2 | 26.6 | Clear Brown |
| Composition 17 | Lutensol TDA10 | 50 | 4 | 0.2 | 28.7 | Cloudy |
| Comparative Composition 8 | Mazon 40 | 70 | 7 | 0.2 | 32.5 | Clear |
| Comparative | Mazon 40 | 60 | 6 | 0.2 | 32.9 | Clear Brown |

Figure 4B

| Composition | Commercial Name of Additive | Temp. of Comp. (°C) During Testing | Weight % NaOH | Weight % Additive | Average Wetting Time | Appearance |
|---|---|---|---|---|---|---|
| Composition 9 | | | | | | |
| Comparative Composition 10 | Mazon 40 | 50 | 6 | 0.2 | 35.1 | Clear Brown |
| Comparative Composition 11 | Glucapon 425 | 60 | 6 | 0.2 | 36.2 | Clear |
| Comparative Composition 12 | Lutensol A12N | 50 | 5 | 0.2 | 37.1 | Clear |
| Composition 18 | TDA 3 PE | 70 | 7 | 0.2 | 40.6 | Hazy |
| Comparative Composition 13 | Lutensol A12N | 60 | 5 | 0.2 | 41.5 | Cloudy |
| Composition 19 | Plurafac LP131 | 50 | 5 | 0.2 | 42.4 | Cloudy |
| Comparative Composition 14 | Strodex KM0VOC | 50 | 5 | 0.2 | 48.5 | Cloudy |
| Composition 20 | Maphos M36 PE | 50 | 5 | 0.2 | 58.9 | Clear |
| Comparative Composition 15 | Maphos M60 PE | 50 | 5 | 0.2 | 63.4 | Clear |
| Comparative Composition 16 | Pluronic P65 PE | 50 | 5 | 0.2 | 76.5 | Clear |
| Composition 21 | Maphos M36 PE | 60 | 6 | 0.2 | 86.7 | Clear |
| Composition 22 | Maphos M36 PE | 50 | 5 | 0.2 | 88.0 | Clear |
| Composition 23 | Lutensol XP140 | 60 | 6 | 0.2 | 89.1 | Hazy |
| Comparative Composition 17 | Lutensol OP10 | 50 | 6 | 0.2 | 92.2 | Cloudy |
| Comparative Composition 18 | Tetronic 90R4 PE | 60 | 6 | 0.2 | 92.5 | Hazy |
| Comparative Composition 19 | Maphos M60 PE | 50 | 5 | 0.2 | 100.3 | Clear |
| Comparative Composition 20 | Lutensol A12N | 60 | 6 | 0.2 | 101.1 | Hazy |
| Composition 24 | Maphos M36 PE | 70 | 7 | 0.2 | 102.3 | Hazy |
| Comparative Composition 21 | Maphos M60 PE | 60 | 6 | 0.2 | 114.2 | Clear |
| Comparative Composition 22 | Tetronic 304 | 60 | 6 | 0.2 | 115.9 | Hazy |
| Composition 25 | Lutensol TDA10 | 60 | 5 | 0.2 | 135.7 | Cloudy |
| Composition 26 | Lutensol TDA10 and 0.1% Dowfax 2A1 | 70 | 7 | 0.2 | 149.9 | Hazy |
| Comparative Composition 23 | Pluronic P65 PE | 60 | 6 | 0.2 | 250.7 | Clear |
| Composition 27 | Lutensol XP70 | 70 | 7 | 0.2 | 355.8 | Hazy |
| Composition 38 | Lutensol TO5 | 70 | 7 | 0.2 | 504.5 | Hazy |
| Composition 28 | Lutensol XL80 | 70 | 7 | 0.2 | 543.0 | Hazy |
| Composition 30 | Iconol TDA8 | 70 | 7 | 0.2 | >600 | Hazy |
| Comparative Composition 31 | Klearfac AA270 PE | 50 | 5 | 0.2 | >600 | Clear |
| Composition 32 | TDA 3 | 70 | 7 | 0.2 | >600 | Hazy |
| Composition 33 | Lutensol XP40 | 70 | 7 | 0.2 | >600 | Hazy |
| Composition 34 | Lutensol XP50 | 70 | 7 | 0.2 | >600 | Hazy |
| Composition 35 | Lutensol XL50 | 70 | 7 | 0.2 | >600 | Hazy |

Figure 4B (Continued)

| Composition | Commercial Name of Additive | Temp. of Comp. (°C) During Testing | Weight % NaOH | Weight % Additive | Average Wetting Time | Appearance |
|---|---|---|---|---|---|---|
| Composition 36 | Lutensol XL70 | 70 | 7 | 0.2 | >600 | Hazy |
| Comparative Composition 25 | Dephat 160C 0.2% Active | 70 | 7 | 0.2 | >600 | Clear |
| Comparative Composition 26 | Lutensol A12N PE | 50 | 5 | 0.2 | >600 | Clear |
| Comparative Composition 27 | Lutensol A12N PE | 50 | 5 | 0.2 | >600 | Clear |
| Comparative Composition 28 | Maphos 66H | 50 | 6 | 0.2 | >600 | Clear |
| Comparative Composition 29 | Maphos 8135 | 50 | 6 | 0.2 | >600 | Hazy |
| Comparative Composition 30 | 2PH PE | 70 | 7 | 0.2 | INS | Hazy |

Figure 4B (Continued)

TABLE 4C

| Composition | Commercial Name of Additive | Temp. of Comp. (°C) During Testing | Weight % NaOH | Weight % Additive | Average Wetting Time | Appearance |
|---|---|---|---|---|---|---|
| Composition 3 | Lutensol TDA10 | 50 | 3 | 0.3 | 2.7 | Clear |
| Composition 5 | Lutensol XP140 | 50 | 3 | 0.3 | 3.4 | Clear |
| Comparative Composition 5 | Lutensol A12N | 50 | 3 | 0.3 | 20.4 | Clear |
| Comparative Composition 32 | Klearfac AA270 PE | 50 | 5 | 0.3 | >600 | Clear |

*Figure 4C*

TABLE 5A

| Composition | Commercial Name of Additive | Temp. of Comp. (°C) During Testing | Weight % NaOH | Weight % Additive | Average Wetting Time | Appearance |
|---|---|---|---|---|---|---|
| Composition 3 | Lutensol TDA10 | 50 | 3 | 0.3 | 2.7 | Clear |
| Composition 5 | Lutensol XP140 | 50 | 3 | 0.3 | 3.4 | Clear |
| Comparative Composition 5 | Lutensol A12N | 50 | 3 | 0.3 | 20.4 | Clear |

*Figure 5A*

TABLE 5B

| Composition | Commercial Name of Additive | Temp. of Comp. (°C) During Testing | Weight % NaOH | Weight % Additive | Average Wetting Time | Appearance |
|---|---|---|---|---|---|---|
| Composition 4 | Lutensol XP140 | 50 | 4 | 0.2 | 3.3 | Clear |
| Comparative Composition 3 | Lutensol A12N | 50 | 4 | 0.2 | 19.2 | Clear |
| Composition 17 | Lutensol TDA10 | 50 | 4 | 0.2 | 28.7 | Cloudy |

*Figure 5B*

TABLE 5C

| Composition | Commercial Name of Additive | Temp. of Comp. (°C) During Testing | Weight % NaOH | Weight % Additive | Average Wetting Time | Appearance |
|---|---|---|---|---|---|---|
| Composition 1 | Lutensol XP100 | 50 | 5 | 0.2 | 2.3 | Hazy |
| Composition 2 | Lutensol TDA10 | 50 | 5 | 0.2 | 2.6 | Hazy |
| Composition 6 | Lutensol XP140 | 50 | 5 | 0.2 | 4.3 | Clear |
| Comparative Composition 1 | Mazon 40 | 50 | 5 | 0.2 | 16.5 | Clear Brown |
| Comparative Composition 12 | Lutensol A12N | 50 | 5 | 0.2 | 37.1 | Clear |
| Comparative Composition 13 | Lutensol A12N | 60 | 5 | 0.2 | 41.5 | Cloudy |
| Composition 19 | Plurafac LF131 | 50 | 5 | 0.2 | 42.4 | Cloudy |
| Comparative Composition 14 | Strodex KM0VOC | 50 | 5 | 0.2 | 48.5 | Cloudy |
| Composition 20 | Maphos M36 PE | 50 | 5 | 0.2 | 58.9 | Clear |
| Comparative Composition 15 | Maphos M60 PE | 50 | 5 | 0.2 | 63.4 | Clear |
| Comparative Composition 16 | Pluronic P65 PE | 50 | 5 | 0.2 | 76.5 | Clear |
| Composition 22 | Maphos M36 PE | 50 | 5 | 0.2 | 88.0 | Clear |
| Comparative Composition 19 | Maphos M60 PE | 50 | 5 | 0.2 | 100.3 | Clear |
| Composition 25 | Lutensol TDA10 | 60 | 5 | 0.2 | 135.7 | Cloudy |
| Comparative Composition 31 | Klearfac AA270 PE | 50 | 5 | 0.2 | >600 | Clear |
| Comparative Composition 32 | Klearfac AA270 PE | 50 | 5 | 0.3 | >600 | Clear |
| Comparative Composition 26 | Lutensol A12N PE | 50 | 5 | 0.2 | >600 | Clear |
| Comparative Composition 27 | Lutensol A12N PE | 50 | 5 | 0.2 | >600 | Clear |

*Figure 5C*

TABLE 5D

| Composition | Commercial Name of Additive | Temp. of Comp. (°C) During Testing | Weight % NaOH | Weight % Additive | Average Wetting Time | Appearance |
|---|---|---|---|---|---|---|
| Composition 12 | TDA 3 PE | 60 | 6 | 0.2 | 7.2 | Hazy |
| Composition 14 | Exal 8 300 PEG PE | 60 | 6 | 0.2 | 15.9 | Hazy |
| Comparative Composition 4 | Lutensol GD70 | 60 | 6 | 0.2 | 20.2 | Clear Yellow |
| Comparative Composition 7 | Mazon 40 | 60 | 6 | 0.2 | 26.6 | Clear Brown |
| Comparative Composition 9 | Mazon 40 | 60 | 6 | 0.2 | 32.9 | Clear Brown |
| Comparative Composition 10 | Mazon 40 | 50 | 6 | 0.2 | 35.1 | Clear Brown |
| Comparative Composition 11 | Glucapon 425 | 60 | 6 | 0.2 | 36.2 | Clear |
| Composition 21 | Maphos M36 PE | 60 | 6 | 0.2 | 86.7 | Clear |
| Composition 23 | Lutensol XP140 | 60 | 6 | 0.2 | 89.1 | Hazy |
| Comparative Composition 17 | Lutensol OP10 | 50 | 6 | 0.2 | 92.2 | Cloudy |
| Comparative Composition 18 | Tetronic 90R4 PE | 60 | 6 | 0.2 | 92.5 | Hazy |
| Comparative Composition 20 | Lutensol A12N | 60 | 6 | 0.2 | 101.1 | Hazy |
| Comparative Composition 21 | Maphos M60 PE | 60 | 6 | 0.2 | 114.2 | Clear |
| Comparative Composition 22 | Tetronic 304 | 60 | 6 | 0.2 | 115.9 | Hazy |
| Comparative Composition 23 | Pluronic P65 PE | 60 | 6 | 0.2 | 250.7 | Clear |
| Comparative Composition 28 | Maphos 66H | 50 | 6 | 0.2 | >600 | Clear |
| Comparative Composition 29 | Maphos 8135 | 50 | 6 | 0.2 | >600 | Hazy |

*Figure 5D*

TABLE 5E

| Composition | Commercial Name of Additive | Temp. of Comp. (°C) During Testing | Weight % NaOH | Weight % Additive | Average Wetting Time | Appearance |
|---|---|---|---|---|---|---|
| Composition 7 | Lutensol XP40 PE | 70 | 7 | 0.2 | 4.8 | Hazy |
| Composition 8 | Lutensol XL50 PE | 70 | 7 | 0.2 | 4.8 | Clear |
| Composition 9 | Lutensol XP50 PE | 70 | 7 | 0.2 | 5.1 | Clear |
| Composition 10 | Lutensol XL70 PE | 70 | 7 | 0.2 | 6.8 | Clear |
| Composition 11 | TDA 3 PE | 70 | 7 | 0.2 | 6.9 | Hazy |
| Composition 39 | Lutensol TO5 PE | 70 | 7 | 0.2 | 7.7 | Hazy |
| Composition 13 | TDA 3 PE | 70 | 7 | 0.2 | 8.7 | Hazy |
| Comparative Composition 2 | Glucopon 600UP | 70 | 7 | 0.2 | 17.8 | Clear |
| Composition 15 | TDA 3 PE | 60 | 7 | 0.2 | 23.1 | Hazy |
| Comparative Composition 6 | Lutensol GD70 | 70 | 7 | 0.2 | 24.4 | Clear |
| Composition 16 | Lutensol XP70 w Deriphat 160C | 70 | 7 | 0.2 | 25.8 | Hazy |
| Comparative Composition 8 | Mazon 40 | 70 | 7 | 0.2 | 32.5 | Clear |
| Composition 18 | TDA 3 PE | 70 | 7 | 0.2 | 40.6 | Hazy |
| Composition 24 | Maphos M36 PE | 70 | 7 | 0.2 | 102.3 | Hazy |
| Composition 26 | Lutensol TDA10 and 0.1% Dowfax 2A1 | 70 | 7 | 0.2 | 149.9 | Hazy |
| Composition 27 | Lutensol XP70 | 70 | 7 | 0.2 | 355.8 | Hazy |
| Composition 38 | Lutensol TO5 | 70 | 7 | 0.2 | 504.5 | Hazy |
| Composition 28 | Lutensol XL80 | 70 | 7 | 0.2 | 543.0 | Hazy |
| Composition 33 | Lutensol XP40 | 70 | 7 | 0.2 | >600 | Hazy |
| Composition 34 | Lutensol XP50 | 70 | 7 | 0.2 | >600 | Hazy |
| Composition 35 | Lutensol XL50 | 70 | 7 | 0.2 | >600 | Hazy |
| Composition 36 | Lutensol XL70 | 70 | 7 | 0.2 | >600 | Hazy |
| Composition 30 | Iconol TDA8 | 70 | 7 | 0.2 | >600 | Hazy |
| Composition 32 | TDA 3 | 70 | 7 | 0.2 | >600 | Hazy |
| Comparative Composition 25 | Deriphat 160C 0.2% Active | 70 | 7 | 0.2 | >600 | Clear |
| Comparative Composition 30 | 2PH PE | 70 | 7 | 0.2 | INS | Hazy |

*Figure 5E*

TABLE 5F

| Composition | Commercial Name of Additive | Temp. of Comp. (°C) During Testing | Weight % NaOH | Weight % Additive | Average Wetting Time | Appearance |
|---|---|---|---|---|---|---|
| Composition 40 | Lutensol XP90 PE | 70 | 9 | 0.2 | 7 | Clear |
| Composition 31 | Lutensol TDA10 | 70 | 9 | 0.1 | >600 | Cloudy |
| Comparative Composition 24 | Lutensol A12N | 70 | 9 | 0.1 | 630.5 | Cloudy |
| Composition 29 | Lutensol XP100 | 70 | 9 | 0.1 | 947.0 | Cloudy |

*Figure 5F*

METHOD OF DIGESTING LIGNOCELLULOSIC MATERIAL

RELATED APPLICATIONS

This application is the National Stage of International Patent Application No. PCT/US2013/025379, filed on Feb. 8, 2013, which claims priority to and all the advantages of U.S. Provisional Patent Application No. 61/596,904, filed on Feb. 9, 2012, the content of which is incorporated herein by reference.

FIELD OF THE DISCLOSURE

The present disclosure is generally related to a method of digesting lignocellulosic material. More specifically, the method utilizes a caustic composition that includes a particular branched digestion additive.

DESCRIPTION OF THE RELATED ART

As is well known in the art, lignocellulosic materials, such as woodchips, include lignin and cellulose. The lignin and the cellulose bind the lignocellulosic materials together. The cellulose can be recovered from the lignocellulosic materials and used to form other products. In the Kraft process for making wood pulp, woodchips are digested in a digester at high temperatures in a caustic solution. The woodchips swell in the caustic solution allowing the caustic solution to penetrate into the woodchips. The caustic solution dissolves the woodchips and lignin in the woodchips and allows the cellulose to be recovered. Typically, not all of the woodchips are dissolved thereby resulting in a number of woodchips which must be screened from the caustic solution and removed. This screening lowers the ultimate yield of the cellulose that can be recovered, increases processing time, and increases costs. Accordingly, there remains an opportunity to develop an improved process.

SUMMARY OF THE DISCLOSURE AND ADVANTAGES

This disclosure provides a method of digesting lignocellulosic material. The method includes the steps of providing the lignocellulosic material and providing a caustic composition having a pH of at least about 10. The caustic composition includes water, an alkaline- or alkaline earth-metal hydroxide, and up to about 1 percent by weight based on a total weight of the composition of a branched digestion additive. The branched digestion additive has the structure:

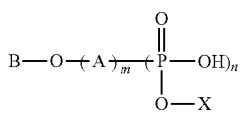

wherein A is at least one alkyleneoxy group and each alkyleneoxy group has from 2 to 4 carbon atoms, n is 0 or 1, B is a branched aliphatic hydrocarbon group having from 8 to 15 carbon atoms, X is H or B—O-$(A)_m$, and each m is independently an average value from 3 to 30, and wherein the caustic composition has a Draves Wetting Time of less than 100 seconds as determined using ASTM D2281. In addition to the aforementioned steps, the method also includes the steps of combining the lignocellulosic material and the caustic composition to form a mixture and heating the lignocellulosic material and/or the caustic composition to digest the lignocellulosic material.

The branched digestion additive facilitates wetting of the lignocellulosic material by the water which, in turn, allows the caustic composition to penetrate into, and dissolve, the lignocellulosic material. If included, the phosphate group of the branched digestion additive typically increases solubility of the branched digestion additive in the caustic composition thereby generally increasing the ability of the caustic composition to wet and penetrate the lignocellulosic material. The alkyleneoxy group of the branched digestion additive typically increases the hydrophilicity of the branched digestion additive and increases the ability of the caustic composition to penetrate the lignocellulosic material. The branched aliphatic hydrocarbon group typically increases the hydrophobicity of the branched digestion additive and increases the ability of the caustic composition to interact with the lignocellulosic material which further aids in digestion. The Draves Wetting Time of less than 100 seconds indicates that the branched digestion additive effectively wets the lignocellulosic material such that the water and the caustic composition to interact with, and penetrate, the lignocellulosic material. Decreased Draves Wetting Times may result in a need for less vigorous conditions to be used including lower temperatures, shorter residence times, and less extreme alkalinity.

BRIEF DESCRIPTION OF THE SEVERAL VIEWS OF THE DRAWINGS

Other advantages of the present disclosure will be readily appreciated, as the same becomes better understood by reference to the following detailed description when considered in connection with the accompanying drawings wherein:

FIG. 1 includes Table 1 wherein each of the Compositions and Comparative Compositions evaluated in the Examples are set forth and sorted such that all Compositions are organized together and all Comparative Compositions are organized together. Table 1 includes the Draves Wetting Times of each Composition and Comparative Composition.

FIG. 2 includes Table 2 wherein each of the Compositions and Comparative Compositions evaluated in the Examples are set forth and sorted relative to Draves Wetting Times in ascending order. Table 2 includes the identical data as Table 1.

FIGS. 3A, 3B, and 3C include Tables 3A, 3B, and 3C, respectively, wherein each of the Compositions and Comparative Compositions evaluated in the Examples are set forth by temperature and sorted relative to Draves Wetting Times in ascending order.

FIGS. 4A and 4B include Tables 4A and 4B respectively, wherein each of the Compositions and Comparative Compositions are set forth by weight percent of the additives and sorted relative to Draves Wetting Times in ascending order. FIG. 4C includes Table 4C wherein each of the each of the Compositions and Comparative Compositions are set forth by weight percent of the additives and sorted relative to Draves Wetting times in ascending order. FIG. 4C and Table 4C include the data set forth in Table 5A and also include data related to an additional Comparative Composition 32.

FIGS. 5A, 5B, 5C, 5D, 5E, and 5F include Tables 5A, 5B, 5C, 5D, 5E, and 5F, respectively, wherein each of the Compositions and Comparative Compositions evaluated in the Examples are set forth by weight percent of sodium hydroxide and sorted relative to Draves Wetting Times in ascending order.

DETAILED DESCRIPTION OF THE DISCLOSURE

Figure 6:
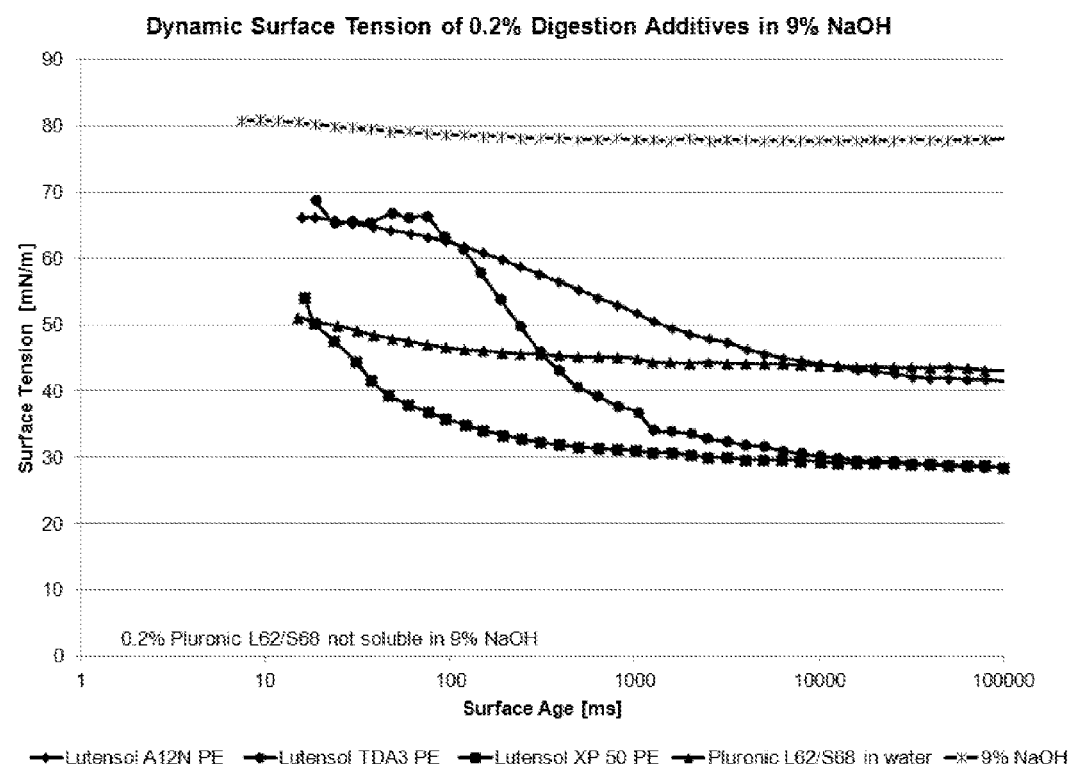
FIG. 6 is a line graph of Dynamic Surface Tension of 0.2% Digestion Additives in 9% NaOH as a function of surface age, as described in the Examples.

This disclosure provides a method of digesting lignocellulosic material. Most typically, the lignocellulosic material includes both lignin and cellulose. The terminology "lignocellulosic material" is not specifically limited and may be further defined as, or as including, consisting essentially of (for example, free of non-lignocellulosic material), or consisting of, materials (or precursors thereof) derived from wood, bagasse, straw, flax residue, nut shells, cereal grain hulls, or any material that includes lignin and cellulose, and combinations thereof. In various embodiments, the lignocellulosic material is prepared from various species of hardwoods and/or softwoods, as understood in the art. The lignocellulosic material may be derived from a variety of processes, such as by comminuting logs, industrial wood residue, branches, rough pulpwood, etc. into pieces in the form of sawdust, chips, flakes, wafer, strands, scrim, fibers, sheets, etc. Most typically, the lignocellulosic material is further defined as woodchips, wood pieces, or wood pulp.

The method of this disclosure digests, or breaks down, either partially or entirely, the lignin as described above and typically allows the cellulose to be recovered from the lignocellulosic material. Said differently, this method is typically used to prepare the lignocellulosic material such that cellulose can be recovered therefrom. The cellulose can be recovered using any number of different methods as known in the art. The instant method may include one or more steps of such methods relative to the recovery of cellulose, but such steps are not required.

The method of this disclosure includes the step of providing the lignocellulosic material. The step of providing is not particularly limited and may include delivering, supplying etc. In various embodiments, the step of providing may be further defined as supplying the lignocellulosic material in one or more forms as described above by grinding, chipping, pulverizing, comminuting, shredding, and cutting the lignocellulosic material or a precursor thereof.

Caustic Composition:

The method also includes the step of providing a caustic composition having a pH of at least about 10. It is contemplated that the caustic composition may have any pH, including fractional values, at or over about 10, e.g. ±0.1, 0.2, 0.3, 0.4, or 0.5. Just as above, the step of providing is not particular limited. In one embodiment, the caustic composition is purchased. In another embodiment, the caustic composition is formulated or made. The caustic composition may also be described as an alkaline composition. The caustic composition has a pH of at least about 10 and, in various embodiments, has a pH of from 10 to 14, 11 to 13, 12 to 13, etc. (including fractional values). It is also possible that the caustic composition may have a pH that exceeds 14.

The caustic composition includes water, an alkaline- or alkaline earth-metal hydroxide, and up to about 1 percent by weight based on a total weight of the composition of a branched digestion additive.

Water:

The water is not particularly limited in type or purity and may include distilled water, well water, tap water, etc. In addition, the amount of water present in the caustic composition is also not particularly limited. In various embodiments, the water is present in an amount of greater than 5, 10, 15, 20, 25, 30, 35, 40, 45, 50, 55, 60, 65, 70, 75, 80, 85, 90, 91, 92, 93, 94, 95, 96, 97, 98, or 99, parts by weight per 100 parts by weight of the caustic composition. In other embodiments, the water is present in an amount of from 90 to 99 or from 95 to 99, parts by weight per 100 parts by weight of the caustic composition. It is contemplated that one or more of the aforementioned values may be any value or range of values, both whole and fractional, within the aforementioned ranges and/or may vary by ±5%, ±10%, ±15%, ±20%, ±25%, ±30%, etc.

Alkaline- or Alkaline Earth-Metal Hydroxide:

Referring to the metal hydroxide, the metal hydroxide may be further defined as an alkaline metal hydroxide, an alkaline earth metal hydroxide, and/or a combination of alkaline metal and alkaline earth metal hydroxides. These metal hydroxides are also typically described as strong bases. Typically, the metal hydroxide is further defined as sodium hydroxide, potassium hydroxide, magnesium hydroxide, calcium hydroxide, e.g. hydroxides of metals of Group IA or IIA of the Periodic Table. It is understood in the art that when a metal hydroxide is added to water, the metal hydroxide dissociates, either partially or entirely, to form metal ions and hydroxide ions. Accordingly, the terminology "metal hydroxide" may describe both the metal hydroxide itself (prior to dissociation) and/or the dissociation product of the metal hydroxide including the metal ions and the hydroxide ions. Said differently, the caustic composition may include metal ions and hydroxide ions formed from the dissociation of the metal hydroxide in the water.

The amount of the metal hydroxide (or dissociation products thereof) in the caustic composition is not particularly limited so long as the caustic composition has a pH of at least about 10. It is contemplated that the metal hydroxide may be used in an amount that, in and of itself, is not sufficient to raise the pH of the caustic composition to at least about 10 such that the caustic composition may be supplemented with an additional base (or weak acid with a pKa of more than about 10-13) to raise the pH of the caustic composition to a pH of at least about 10. For example, in such an embodiment, the caustic composition may include the metal hydroxide and another base (or weak acid). Accordingly, it is also contemplated that one or more additional compounds may be added to the caustic composition, along with the metal hydroxide, to raise the pH of the caustic composition to at least about 10. Even if an amount of the metal hydroxide (or dissociation products thereof) is sufficient to raise the pH of the caustic composition to at least about 10, the one or more additional compounds may still be utilized, as described above.

In various embodiments, the metal hydroxide, prior to dissociation, is present in, or added to, the caustic composition in amounts of from 1 to 20, 1 to 15, 1 to 10, from 2 to 8, from 3 to 7, from 4 to 6, or from 4 to 5, parts by weight per 100 parts by weight of the caustic composition. It is contemplated that the metal hydroxide may be present in the caustic composition in amounts up to and exceeding solubility/saturation limits for one or more metal hydroxides.

Said differently, the metal hydroxide may be added to the caustic composition in an amount that equals or exceeds the amount that would saturate the caustic composition with the metal hydroxide (e.g. more than 10, 15, 20, etc.). In such an embodiment, there might be excessive (non-dissolved) metal hydroxide remaining in the caustic composition.

Branched Digestion Additive:

As first introduced above, the caustic composition also includes up to about 1 percent by weight based on a total weight of the composition of the branched digestion additive. The branched digestion additive may be a single compound or a mixture of two or more compounds so long as each compound independently has the following formula:

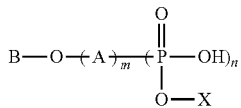

wherein A is at least one alkyleneoxy group and each alkyleneoxy group independently has from 2 to 4 carbon atoms, n is 0 or 1, B is a branched aliphatic hydrocarbon group having from 8 to 15 carbon atoms, X is H or $B-O-(A)_m$, and m is independently an average value from 3 to 30.

Typically, when the branched digestion additive includes an ester, the branched digestion additive also includes a di-ester. For example, the branched digestion additive may include the monoester and/or the diester having the following structures:

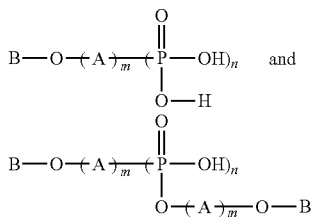

wherein the B, A, m, and n are as described above or below.

The at least one alkyleneoxy group may include, but is not limited to, ethyleneoxy groups (2 carbon atoms), propyleneoxy groups (3 carbon atoms), butyleneoxy groups (4 carbon atoms), and combinations thereof. The butyleneoxy groups may include any or all of 1,2-butylene oxide groups, 2,3-butylene oxide groups, and isobutylene oxide groups. In one embodiment, A is further defined as one or more ethyleneoxy groups (2 carbon atoms). In another embodiment, A is further defined as a mixture of ethyleneoxy groups and propyleneoxy groups. In still another embodiment, A is further defined as one or more propyleneoxy groups (3 carbon atoms). If A is further defined as including or being more than one alkyleneoxy group, the group orientation/order is not particularly limited such that the alkyleneoxy groups can be arranged as blocks, randomly, etc.

In addition, in this formula, each m is independently an average value of from 3 to 30. It is contemplated that each m may be higher, such as 35 or 40. In various embodiments, each m is independently an average value of from 3 to 25, 3 to 20, 3 to 15, 3 to 14, 4 to 13, from 5 to 12, from 6 to 11, from 7 to 10, or from 8 to 9. In other words, the branched digestion additive may include an average of from 3 to 30 (or 35 or 40) moles of alkyleneoxy groups per mole of the branched digestion additive itself. It is also contemplated that m may be a fractional average value within the aforementioned ranges representing an average molar amount of alkyleneoxy groups present in the branched digestion additive. As is known in the art, the values of subscripts for repeating monomeric units in a polymer tend to be reported as average values, as described above. Also in this formula, n is 0 or 1. Said differently, the branched digestion additive may include a phosphate group or may be free of a phosphate group. Typically, the phosphate group is bonded to the alkyleneoxy group through a carbon-oxygen-phosphorous bond, as shown below:

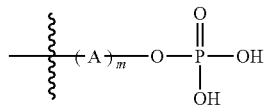

wherein A is as described above or below.

Moreover, B is a branched aliphatic hydrocarbon group having from 8 to 15 carbon atoms. It is contemplated that B may include a mixture of different aliphatic hydrocarbon groups each having 8, 9, 10, 11, 12, 13, 14, or 15 carbon atoms. In various embodiments, the branched aliphatic hydrocarbon group has from 9 to 14, from 10 to 13, or from 11 to 12 carbon atoms. Alternatively, B can be an aliphatic hydrocarbon group having 8 carbon atoms, 9 carbon atoms, 10 carbon atoms, 11 carbon atoms, 12 carbon atoms, 13 carbon atoms, 14 carbon atoms, or 15 carbon atoms.

In one embodiment, B is an aliphatic hydrocarbon group having 10 carbon atoms. An example of a particularly suitable hydrocarbon group having 10 carbon atoms includes, but is not limited to, a 2-propylheptane group. It is to be understood that the terminology "2-propylheptane group" refers to a $C_{10}H_{22}$ group. For descriptive purposes only, a chemical structure of the 2-propylheptane group is shown below:

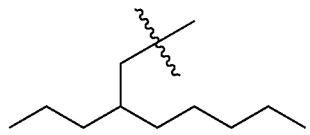 [SMILES: *CC(CCC)CCCCC]

In one embodiment, the branched digestion additive is further defined as having the following structure:

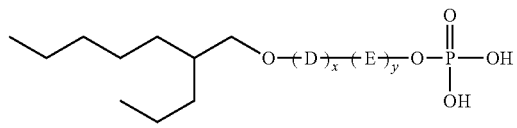

wherein D is a propyleneoxy group and E is an ethyleneoxy group and wherein x is an average value from 0 to 4 and y is an average value from 3 to 14.

In still another embodiment, the branched digestion additive may be further defined as having the structure:

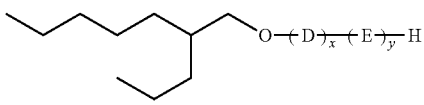

wherein D is a propyleneoxy group and E is an ethyleneoxy group and wherein x is an average value from 0 to 4 and y is an average value from 3 to 14.

In yet another embodiment, the branched digestion additive is further defined as a mixture of compounds having the structures:

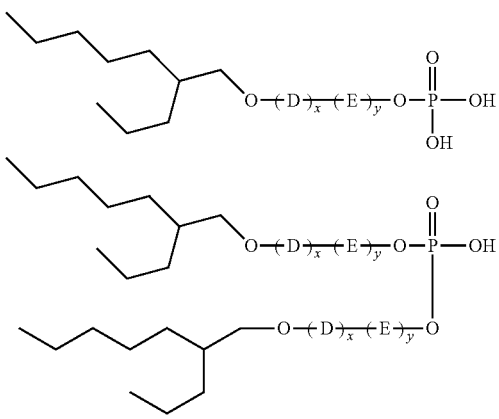

wherein each D is a propyleneoxy group and each E is an ethyleneoxy group and wherein each x is an average value of about 2 and each y is an average value of about 5. Alternatively, in still another embodiment, D is a propyleneoxy group and E is an ethyleneoxy group and wherein x is an average value from 0 to 4 and y is an average value from 3 to 10.

In another embodiment, the branched digestion additive includes a mixture of compounds having the structures:

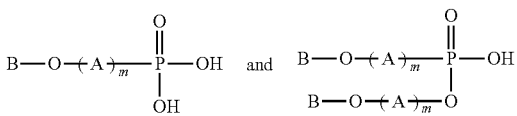

wherein each A is independently at least one alkyleneoxy group and each alkyleneoxy group has from 2 to 4 carbon atoms, each m is independently an average value from 3 to 14, and each B is independently a branched aliphatic hydrocarbon group having from 8 to 15 carbon atoms.

In still another embodiment, B is further defined as a tridecyl alcohol group. It is also contemplated that the branched digestion additive may be further defined as including a 2-propyl heptane group, about 1.8 propyleneoxy groups, and about 5 ethyleneoxy groups;

a 2-propyl heptane group, about 1.8 propyleneoxy groups, and about 7 ethyleneoxy groups;

a 2-propyl heptane group, about 1.8 propyleneoxy groups, and about 8 ethyleneoxy groups;

a 2-propyl heptane group and about 7 ethyleneoxy groups;

a 2-propyl heptane group and about 10 ethyleneoxy groups;

a 2-propyl heptane group and about 14 ethyleneoxy groups;

a 2-propyl heptane group, about 4 ethyleneoxy groups, and a phosphate ester group;

a 2-propyl heptane group, about 5 ethyleneoxy groups, and a phosphate ester group;

a mixture of branched C10-C12 groups, about 2 propyleneoxy groups, about 13 ethyleneoxy groups, and a phosphate ester group;

a branched C13 group and about 10 ethyleneoxy groups;

a branched C13 group and about 3 ethyleneoxy groups;

a branched C13 group, about 3 ethyleneoxy groups, and a phosphate ester group;

a branched C13 group, about 6 ethyleneoxy groups, and a phosphate ester group;

branched C13 group and about 8 ethyleneoxy groups;

a branched C8 polyethylene glycol group and a phosphate ester group; and a branched C9-C11 group, about 1.5 butyleneoxy groups, and about 7 ethyleneoxy groups, and/or combinations thereof.

In another embodiment, the caustic composition (and/or the branched digestion additive itself) is substantially free of aliphatic hydrocarbons (or groups) having less than 8 carbon atoms and/or more than 15 carbon atoms. The terminology "substantially free" refers to an amount of such hydrocarbons (or groups) of preferably of less than 10% by weight, more preferably of less than 5% by weight, even more preferably of less than 1% by weight, and most preferably of less than 0.1% by weight, of the caustic composition and/or the branched digestion additive.

The terminology "branched aliphatic hydrocarbon group" describes at least one group (and the branched digestion additive as a whole) that is not linear, e.g. a group wherein one or more carbon atoms is each attached to more than two independent carbon atoms. In one embodiment, the branched aliphatic hydrocarbon group is further defined as a group that includes at least a $C_2$ or greater carbon containing group pendant from a backbone. In another embodiment, the branched aliphatic hydrocarbon group is further defined as being at least 50, 55, 60, 65, 70, 75, 80, 85, 90, 95, or 99, percent branched, as understood by those of skill in the art. Alternatively, the branched aliphatic hydrocarbon group may be from 80 to 100, from 85 to 100, from 90 to 100, from 95 to 100, or about 100, percent branched. In one embodiment, the branched digestion additive is as described in U.S. Pat. No. 7,671,006, which is expressly incorporated herein by reference but does not limit this disclosure.

The branched digestion additive is present in an amount of up to about 1, 0.9, 0.8, 0.7, 0.6, 0.5, 0.4, 0.3, 0.2, 0.1, 0.09, 0.08, 0.07, 0.06, 0.05, 0.04, 0.03, 0.02, 0.01, etc., percent by weight based on a total weight of the caustic composition. In various embodiments, the branched digestion additive is present in an amount of from 500 to 5,000, from 500 to 4,000, from 500 to 3,000, from 500 to 2,000, or from 500 to 1,000, parts by weight per one million parts by weight of the caustic composition. In other embodiments, the branched digestion additive is present in amounts of from 0.5 to 1, 0.6 to 0.9, or 0.7 to 0.8, percent by weight based on a total weight of the caustic composition. In various embodiments, the caustic composition may include more than 1 of any of the aforementioned branched digestion additives.

Additional Branched Digestion Additive:

The caustic composition may also include one or more additional branched digestion additives in addition to the branched digestion additive described above. The one or more additional branched digestion additives are typically different from the branched digestion additive described above. Typically, the one or more additional branched digestion additives are further defined as having the same or similar branching as described above. However, this is not required.

In one embodiment, an additional branched digestion additive has the structure:

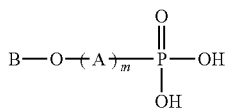

wherein A is an alkyleneoxy group having from 2 to 4 carbon atoms, m is from 3 to 14, and B is a branched aliphatic hydrocarbon group having from 8 to 15 carbon atoms. Typically, in this embodiment, the phosphorous atom is bonded to an oxygen atom of the alkyleneoxy group. In another embodiment, an additional branched digestion additive has the structure:

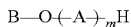

wherein A is an alkyleneoxy group having from 2 to 4 carbon atoms, m is from 3 to 14, and B is a branched aliphatic hydrocarbon group having from 8 to 15 carbon atoms. Even further, an additional branched digestion additive may be further defined as having the structure:

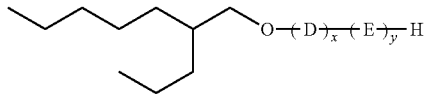

wherein D is a propyleneoxy group and E is an ethyleneoxy group and wherein x is an average value from 0 to 4 and y is an average value from 3 to 10. The additional branched digestion additive may be further defined such that B is further defined as a tridecyl group. It is also contemplated that the one or more additional branched digestion additives may be as described above.

The one or more additional branched digestion additives may also be present in an amount of up to about 1 percent by weight based on a total weight of the caustic composition. In various embodiments, the one or more additional branched digestion additives are present in an amount of from 0.05 to 0.5, from 0.05 to 0.4, from 0.05 to 0.3, from 0.05 to 0.2, from 0.2 to 0.3, or from 0.05 to 0.1, weight percent based on a total weight of the caustic composition. In other embodiments, the one or more additional branched digestion additives are present in amounts of from 0.5 to 1, 0.6 to 0.9, or 0.7 to 0.8, percent by weight based on a total weight of the caustic composition.

The branched digestion additive and/or the one or more additional branched digestion additives may be formed by any method known in the art. In one non-limiting embodiment, the branched digestion additive and/or the one or more additional branched digestion additives are formed using phosphorylation of an alcohol alkoxylate with either $P_2O_5$ or polyphosphoric acid in sub- to super-stoichiometric amount to produce a phosphate ester. Typically, when the branched digestion additive and/or the one or more additional branched digestion additives do not include a phosphate group, any known synthetic method may be used to form the additive.

Additional Additive(s):

In addition to the metal hydroxide and the branched digestion additive and/or the one or more additional branched digestion additives and/or, the caustic composition may include one or more additional additives including, but not limited to, salts and/or bases, sulfides (such as sodium sulfide), hydrosulfides, sulfonates, carboxylic acids, hydrocarbons, and combinations thereof. In one non-limiting embodiment, the caustic composition includes one or more additional additives as described in U.S. Pat. Nos. 4,426,254 and/or 6,551,452, each of which is expressly incorporated herein by reference relative to these additives but does not particularly limit the instant disclosure. In another embodiment, it is alternatively contemplated that the caustic composition may include one or more aliphatic hydrocarbons having less than 8 carbon atoms and/or more than 15 carbon atoms, one or more aromatic, phenyl, or benzyl hydrocarbons, one or more alkanes, alkenes, or alkynes, and/or combinations thereof.

Draves Wetting Time:

The caustic composition has a Draves Wetting Time of less than 100 seconds determined using ASTM D2281. In various embodiments, the caustic composition has a Draves Wetting Time of less than 95, 90, 85, 80, 75, 70, 65, 60, 55, 50, 45, 40, 35, 30, 25, 20, 15, 10, or 5, seconds, as determined using ASTM D2281, or any range or ranges thereof, including any and all fractional values and ranges of fractional values within those described above. In other embodiments, the caustic composition has a Draves Wetting Time of from 1 to 20, 2 to 18, 3 to 17, 4 to 16, 5 to 15, 6 to 14, 7 to 13, 8 to 12, 9 to 11, or 10 to 11, seconds, as determined using ASTM D2281. The Draves Wetting Time of less than 100 seconds indicates that the branched digestion additive effectively wets the lignocellulosic material such that the water and the caustic composition can interact with, and penetrate, the lignocellulosic material. In various embodiments, it is expressly contemplated that the caustic composition may have any Draves wetting time, or ranges of times, both whole and fractional, from about zero up to about 100 seconds.

Additional Method Steps:

In addition to the aforementioned steps, the method also includes the steps of combining the lignocellulosic material and the caustic composition to form a mixture. The lignocellulosic material may be added to the caustic composition or vice versa either batch wise or stepwise. It is also contemplated that various portions of the lignocellulosic material may be added to one or more portions of the caustic composition, or vice versa. The lignocellulosic material and/or the caustic composition may be combined in any order and in any vessel. Typically, they are combined in a digester, as is known in the art. However, they may be first combined in a secondary vessel and transferred to a digester. Alternatively, any other vessel known in the art can be used including, but not limited to, extruders, mixers, reactors, and the like.

In various embodiments, the mixture includes at least 5, 10, 15, 20, 25, 30, 35, 40, 45, 50, 55, 60, 65, 70, 75, 80, 85, 90, or 95, percent by weight of the lignocellulosic material and/or caustic composition, based on a total weight of the mixture. Typically, the mixture includes only the lignocellulosic material and the caustic composition. However, it is contemplated that the mixture may include other additives or components, as is known in the art (e.g., as is used in the Kraft process, in sulfate processes, or in any other wood pulping or digestion process known in the art).

The method also includes the step of heating the lignocellulosic material and/or the caustic composition to digest the lignocellulosic material. The lignocellulosic material may be heated itself, independently from the caustic composition. Similarly, the caustic composition may be heated itself, independently from the lignocellulosic material. Most typically, the lignocellulosic material and the caustic composition (i.e., the mixture) are heated together. The step of heating may be further defined as heating to a temperature of from 100° C. to 200° C., from 120° C. to 190° C., or from 130° C. to 180° C. In various non-limiting embodiments, the method includes one or more method or processing steps as described in one or more of U.S. Pat. Nos. 4,426,254; 6,551,452; and/or 6,649,023, each of which is expressly incorporated herein by reference. The method may also include one or more additional steps known to be typically included in the Kraft Process.

Additional Embodiments

This disclosure also provides a method of digesting woodchips including cellulose and lignin to extract the cellulose therein. This embodiment of the method includes the steps of providing the woodchips comprising the lignin and the cellulose, providing the caustic composition having a pH of at least about 10 and including the water, the alkaline- or alkaline earth-metal hydroxide, and up to about 0.5 percent by weight based on a total weight of the composition of the digestion additive having the structure:

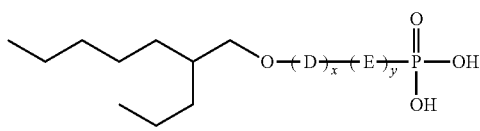

wherein D is a propyleneoxy group and E is an ethyleneoxy group and wherein x is an average value from 0 to 4 and y is an average value from 3 to 14, and wherein the caustic composition has a Draves Wetting Time of less than 10 seconds as determined using ASTM D2281. This embodiment of the method also includes the step of combining the woodchips and the caustic composition to form a mixture and the step of heating the mixture to digest the woodchips.

In one alternative embodiment, the caustic composition consists essentially of (i) water, (ii) the alkaline- or alkaline earth-metal hydroxide, and (iii) the digestion additive. The terminology "consisting essentially of" typically describes the caustic composition as being free of, or including less than 10, 5, 1, 0.5, or 0.1, weight percent of other additives (not including the branched digestion additive such as one or more of those described above) based on a total weight of the caustic composition. It is also contemplated that the caustic composition may consist essentially of (i), (ii), (iii) and up to about 0.5 weight percent of a second digestion additive that is different from the branched digestion additive above and has the structure:

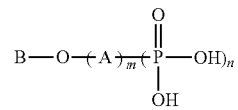

or includes a mixture of compounds having the structures

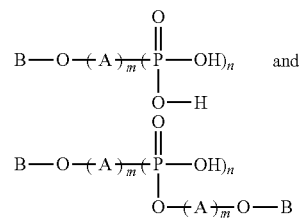

wherein each A is at least one alkyleneoxy group and each alkyleneoxy group has from 2 to 4 carbon atoms, each m is independently an average value from 3 to 14, n is 0 or 1, and each B is independently a branched aliphatic hydrocarbon group having from 8 to 15 carbon atoms. Moreover, it is contemplated that x may be further defined as an average value of from 1 to 2 or about 2 and y may be further defined as an average value of about 5. Alternatively, x may be further defined as zero and y may be further defined as an average value of about 5.

This disclosure also provides a lignocellulosic material digestion system that includes the caustic composition and the lignocellulosic material. The system may be utilized using the method of this disclosure.

EXAMPLES

A series of caustic compositions (Compositions 1-40) are formed in accordance with this disclosure. A series of comparative compositions (Comparative Compositions 1-32) are also formed but do not represent this disclosure. Each of the Compositions and Comparative Compositions includes 3 to 9 weight percent of sodium hydroxide (and thus have a pH of at least about 10), 0.1 to 0.3 weight percent of an additive based on a total weight of the Compositions, respectively, and a balance of water. The additives utilized to form Compositions 1-40 are representative of various embodiments the branched digestion additive of this disclosure. The additives utilized to form Comparative Compositions 1-32 are not representative of the branched digestion additive of this disclosure and thus do not represent this disclosure. Each of the additives is described in the Tables/Figures using commercial trade names.

After formation, each of the Compositions and Comparative Compositions are heated to temperatures of from 50° C. to 70° C. and evaluated at that temperature using ASTM D2281 to determine Draves Wetting Times. The Draves Wetting Times reported below are averages times based on 2-4 independent trials for each Composition and Comparative Composition. Shorter times are indicative of improved wetting and can be correlated to improved wetting of lignocellulosic materials which allows the caustic composition to more effectively interact with and dissolve the lignocellulosic material.

In addition, each Composition and Comparative Composition is visually evaluated to determine whether each is Clear, Hazy, or Cloudy. Clear is generally indicative of (approximately) complete solubility of the additive in the Composition or Comparative Composition. Hazy and Cloudy are indicative of decreasing solubility, respectively, of the additive in the Composition or Comparative Composition.

In Table 1, set forth as FIG. 1, each of the Compositions and Comparative Compositions are set forth and sorted such that all Compositions are organized together and all Comparative Compositions are organized together. The commercial name of the additive, the temperature of each Composition, the weight percent of sodium hydroxide, the weight percent of the additive, the average Draves Wetting Time, and the appearance of each Composition are set forth. The data set forth in Table 1 clearly shows that the Compositions of this disclosure generally outperform, i.e., have lower wetting times than, the Comparative Compositions. As described above, these improved wetting times can be correlated to increased and more complete wetting of lignocellulosic materials and digestion thereof. In addition, the data set forth in Table 1 shows that most of the additives that are representative of this disclosure are (approximately) completely to moderately soluble in the various Compositions.

In Table 2, set forth as FIG. 2, each of the Compositions and Comparative Compositions are set forth and sorted relative to Draves Wetting Times in ascending order. Table 2 includes the identical data as Table 1. The data set forth in this Table is merely resorted for ease of understanding. Just as above, the data set forth in this Table clearly shows that the Compositions of this disclosure generally outperform, i.e., have lower wetting times than, the Comparative Compositions.

In Tables 3A, 3B, and 3C, set forth as FIGS. 3A, 3B, and 3C, each of the Compositions and Comparative Compositions are set forth and sorted relative to temperature of the Composition during determination of Draves Wetting Times. Said differently, these Tables are organized such that temperature is a constant. Tables 3A-C include the identical data as the previous Tables. Just as above, this data shows that the Compositions of this disclosure generally outperform, i.e., have lower wetting times than, the Comparative Compositions, even when compared at different temperatures.

In Tables 4A and 4B below, set forth as FIGS. 4A and 4B, each of the Compositions and Comparative Compositions are set forth and sorted relative to weight percent of the additives. Said differently, these Tables are organized such that the weight percent of the additives is constant. Tables 4A and B include the identical data as the previous Tables. Just as above, this data shows that the Compositions of this disclosure generally outperform, i.e., have lower wetting times than, the Comparative Compositions even when amounts of the additive are changed.

In Tables 5A, 5B, 5C, 5D, 5E, and 5F, set forth as FIGS. 5A, 5B, 5C, 5D, 5E and 5F, each of the Compositions and Comparative Compositions are set forth and sorted relative to weight percent of the sodium hydroxide. Higher weight percentages of sodium hydroxide are correlated to increased pH of the Compositions and Comparative Compositions. These Tables are organized such that the weight percent of sodium hydroxide, and the corresponding pH, are constant. Tables 5A-F include the identical data as the previous Tables. Just as above, this data shows that the Compositions of this disclosure generally outperform, i.e., have lower wetting times than, the Comparative Compositions even when amounts of sodium hydroxide (and corresponding pH) are changed. Said differently, the Compositions of this disclosure act as better wetting agents in high caustic solutions as compared to the Comparative Composition.

Dynamic Surface Tension:

In this disclosure, dynamic surface tension indicates how rapidly a branched digestions additive reduces the surface tension of a solution. Dynamic surface tension data provides information on how rapidly additive molecules that are present in a sample can diffuse to and orient at a newly created surface. At a very low surface age, the surface tension of the solution will be near that of pure water (72 dynes/cm) since the molecules have not had time to diffuse and orient at the surface. At a very high surface age, the surface tension will approach the equilibrium surface tension value.

A series of additional compositions, Compositions 41 to 45 are also formed in accordance with this disclosure. An additional comparative composition (Comparative Compositions 33) is also formed but does not represent this disclosure. Each of the Compositions 41 to 45 and the Comparative Composition 33 includes 9 weight percent of sodium hydroxide (and thus have a pH of at least about 10), 0.2 weight percent of an additive based on a total weight of the Compositions, respectively, and a balance of water. The additives utilized to form Compositions 41 to 45 are representative of various embodiments the branched digestion additive of this disclosure. The additive utilized to form Comparative Compositions 33 is not representative of the branched digestion additive of this disclosure and thus do not represent this disclosure. More specifically, Composition 41 includes Lutensol A12N Phosphate Ester. Composition 42 includes Lutensol TDA 3 PE. Composition 43 includes Lutensol XP 50 PE. Composition 44 includes Lutensol XL 70. Composition 45 includes Lutensol XL 50 PE. Comparative Composition 33 includes Pluronic L62/Pluronic F68 blend 1:1.

After formation, each of the aforementioned Compositions and Comparative Composition is evaluated to determine Dynamic Surface Tension. Dynamic Surface Tension is measured using a Kruss BP100 instrument, as known in the art. More specifically, air bubbles of known volume are pumped into a known amount of samples of the various aforementioned compositions and surface tension is measured. As the rate of air bubbles increases, the surface area (age) also increases. The surface tension increases as the surface area increases. In other words, the time it takes for the additive to migrate to this new surface results in an increase in surface tension. The results of these evaluations are set forth in the line graph of FIG. 6. A low surface tension is typically desirable in this disclosure at the fastest speed. The results set forth in FIG. 6 demonstrate that positive results are achieved by the various compositions of this disclosure.

Critical Micelle Concentration:

Critical micelle concentration (CMC) is a measure of additive efficiency. A micelle is an aggregated unit composed of a number of molecules of a surface active material. The CMC is typically the additive concentration at which an appreciable number of micelles are formed. Micelle formation enables emulsification, solubilization, and dispersion of otherwise non-compatible materials. Before reaching the CMC, surface tension typically changes with a concentration of the additive. After reaching the CMC, the surface tension typically remains relatively constant or changes with a lower slope. The value of the CMC for a given additive in a given medium typically depends on temperature, pressure, and on the presence and concentration of other substances and electrolytes. Micelles tend to only form above critical micelle temperature. A lower CMC indicates that less additive is needed to saturate interfaces and form micelles. In colloidal and surface chemistry, the critical micelle concentration (CMC) is typically described as the concentration of additives above which micelles form and any surfactants added to the system go to micelles.

Figure 7:
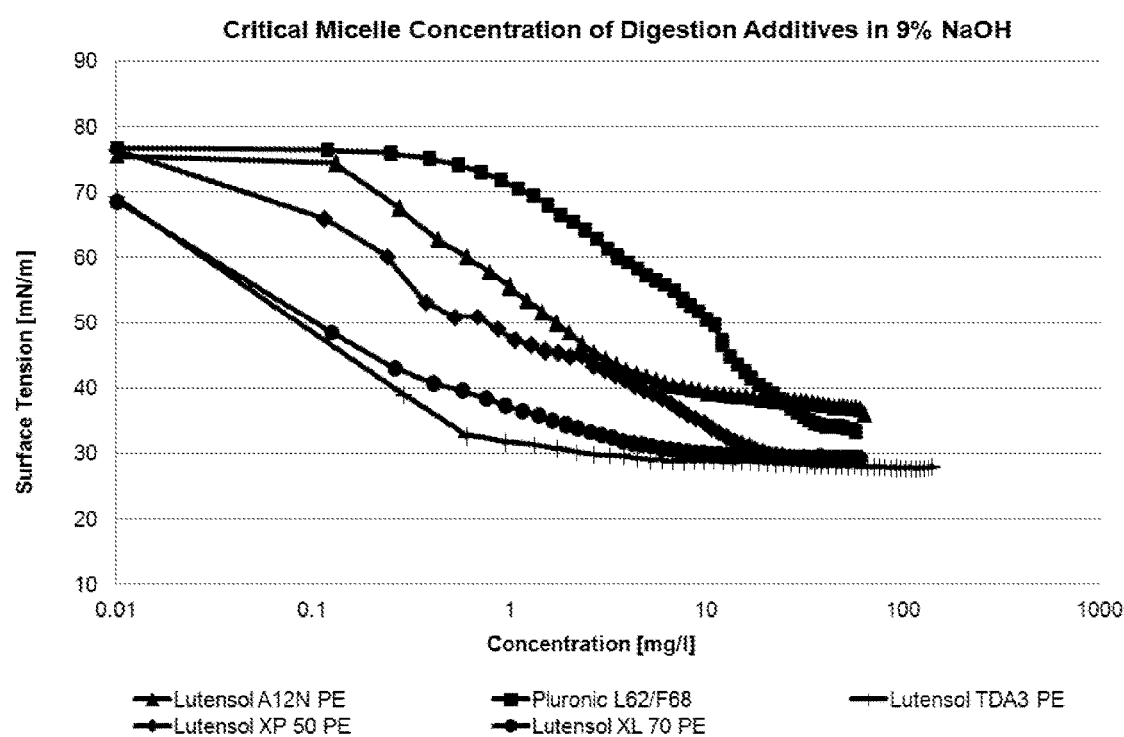
FIG. 7 is a line graph of Critical Micelle Concentration of Digestion Additives in 9% NaOH as a function of concentration, as described in the Examples.
Figure 8:
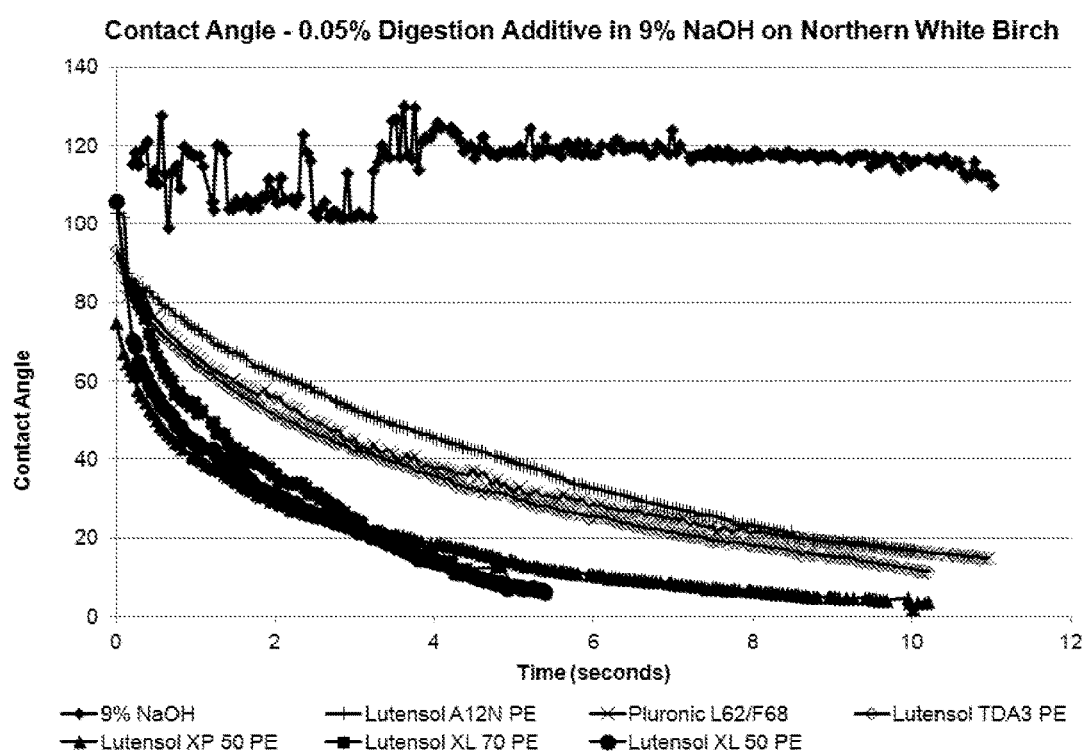
FIG. 8 is a line graph of Contact Angle of Droplets of 0.05% Digestion Additive in 9% NaOH on Northern White Birch as a function of time, as described in the Examples.

Critical Micelle Concentration is measured using a Kruss K100 instrument, as is known in the art. More specifically, a series of 9% aqueous solutions of Sodium Hydroxide are made and various additives are added in increasing amounts. After addition, the surface tension is measured sequentially. Said differently, small amounts of the additive are added and the surface tension measured. This process is repeated continuously until the curve, as set forth in FIG. 7, is complete. More specifically, the following additives are utilized: Lutensol A12N PE (Inventive), Lutensol TDA3 PE (Inventive), Lutensol XP 50 PE (Inventive), Pluronic L62/F68 (Comparative), and Lutensol XL 70 PE (Inventive). The results of these evaluations are set forth in FIG. 8.

The least concentration of additive that can result in a low surface tension in the shortest time is typically desirable in this disclosure. The results set forth in FIG. 7 demonstrate that positive results are achieved by the various compositions of this disclosure.

Contact Angle:

Contact angle, θ, is a quantitative measure of the wetting of a solid by a liquid. It is typically defined geometrically as the angle formed by a liquid at the three phase boundary where a liquid, gas and solid intersect. Low values for contact angle (θ) tend to indicate that the liquid spreads, or wets well, while a high contact angle typically indicates poor wetting. If the angle θ is less than 90 degrees, the liquid is typically described as wetting the solid. If the angle is greater than 90 degrees, the liquid is typically described as non-wetting. A zero contact angle represents complete wetting.

A series of 0.05% solutions of various additives of this disclosure in 9% aqueous Sodium Hydroxide (NaOH) are formed. Droplets of these solutions are then placed on a piece of Northern White Birch and the contact angle is measured by high speed camera using a Kruss DSA 100 instrument, as is known in the art. More specifically, the following additives are utilized: Lutensol A12N PE (Inventive), Lutensol TDA3 PE (Inventive), Lutensol XP 50 PE (Inventive), Pluronic L62/F68 (Comparative), and Lutensol XL 70 PE (Inventive), and Lutensol XL50 PE (Inventive). The lowest contact angle is typically indicative of maximum wetting and is typically desirable in this disclosure. The results set forth in FIG. 8 demonstrate that positive results are achieved by the various compositions of this disclosure.

It is to be understood that one or more of the values described above may vary by ±5%, ±10%, ±15%, ±20%, ±25%, ±30%, etc. so long as the variance remains within the scope of the disclosure. Moreover, all values and ranges of values, both whole and fractional, within or between each of the aforementioned values are expressly contemplated in various non-limiting embodiments. It is also to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The subject matter of all combinations of independent and dependent claims, both singly and multiply dependent, is herein expressly contemplated but is not described in detail for the sake of brevity. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A method of digesting lignocellulosic material, said method comprising the steps of:
   A. providing the lignocellulosic material;
   B. providing a caustic composition having a pH of at least about 10 and consisting essentially of;
   (i) water,
   (ii) an alkaline- or alkaline earth-metal hydroxide present in an amount of from 7 to 20 parts by weight per 100 parts by weight of said caustic composition,
   (iii) about 0.2 to 0.3 percent by weight based on a total weight of the composition of a branched digestion additive having the structure;

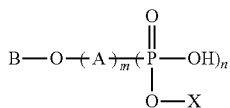

wherein A is at least one alkyleneoxy group and each alkyleneoxy group has from 2 to 3 carbon atoms, n is 1, B is a branched aliphatic hydrocarbon group having from 10 to 13 carbon atoms, X is H, and each m is independently an average value from 3 to 9; and a second digestion additive present in an amount up to 0.5 weight percent that is different from the (iii) branched digestion additive and that comprises:

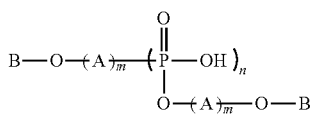

wherein each A is at least one alkyleneoxy group and each alkyleneoxy group has from 2 to 3 carbon atoms, each m is independently an average value from 3 to 9, n is 1, and each B is independently a branched aliphatic hydrocarbon group having from 10 to 13 carbon atoms, wherein the caustic composition has a Draves Wetting Time of less than 10 seconds as determined using ASTM D2281, and wherein the caustic composition is free of a sulfide; and comprises less than 0.1 weight percent of additional additives;

C. combining the lignocellulosic material and the caustic composition to form a mixture; and D. heating the lignocellulosic material and/or the caustic composition to digest the lignocellulosic material.

2. A method as set forth in claim 1 wherein B of the branched digestion additive and the second branched digestion additive is further defined as a tridecyl group.

3. A method as set forth in claim 2 wherein the branched digestion additive is present in an amount of 0.2 weight percent based on a total weight of the composition and the alkaline- or alkaline earth-metal hydroxide is present in amount of from 7 to 9 parts by weight per 100 parts by weight of the caustic composition.

4. A method as set forth in claim 1 wherein B of the branched digestion additive and the second branched digestion additive is a 2-propyl heptanol group.

5. A method as set forth in claim 4 wherein the branched digestion additive is present in an amount of 0.2 weight percent based on a total weight of the composition and the alkaline- or alkaline earth-metal hydroxide is present in amount of from 7 to 9 parts by weight per 100 parts by weight of the caustic composition.

6. A method as set forth in claim 1 wherein each A of the branched digestion additive and the second branched digestion additive is an ethyleneoxy group, wherein each B of the branched digestion additive and the second branched digestion additive is a 2-propyl heptanol group, and wherein each m of the branched digestion additive and the second branched digestion additive is 4.

7. A method as set forth in claim 6 wherein the branched digestion additive is present in an amount of 0.2 weight percent based on a total weight of the composition and the alkaline- or alkaline earth-metal hydroxide is present in amount of from 7 to 9 parts by weight per 100 parts by weight of the caustic composition.

8. A method as set forth in claim 1 wherein each A of the branched digestion additive and the second branched digestion additive is an ethyleneoxy group, wherein each B of the branched digestion additive and the second branched digestion additive is a 2-propyl heptanol group, and wherein each m of the branched digestion additive and the second branched digestion additive is 5.

9. A method as set forth in claim 8 wherein the branched digestion additive is present in an amount of 0.2 weight percent based on a total weight of the composition and the alkaline- or alkaline earth-metal hydroxide is present in amount of from 7 to 9 parts by weight per 100 parts by weight of the caustic composition.

10. A method as set forth in claim 1 wherein each A of the branched digestion additive and the second branched digestion additive is an ethyleneoxy group, wherein each B of the branched digestion additive and the second branched digestion additive is 2-propyl heptanol group, and wherein each m of the branched digestion additive and the second branched digestion additive is 9.

11. A method as set forth in claim 10 wherein the branched digestion additive is present in an amount of 0.2 weight percent based on a total weight of the composition and the alkaline- or alkaline earth-metal hydroxide is present in amount of from 7 to 9 parts by weight per 100 parts by weight of the caustic composition.

12. A method as set forth in claim 1 wherein each A of the branched digestion additive and the second branched digestion additive is a combination of 5 moles of ethyleneoxy groups and 1 mole of a propyleneoxy group such that each m of the branched digestion additive and the second branched digestion additive totals 6, and wherein each B of the branched digestion additive and the second branched digestion additive is a 2-propyl heptanol group.

13. A method as set forth in claim 12 wherein the branched digestion additive is present in an amount of 0.2 weight percent based on a total weight of the composition and the alkaline- or alkaline earth-metal hydroxide is present in amount of from 7 to 9 parts by weight per 100 parts by weight of the caustic composition.

14. A method as set forth in claim 1 wherein each A of the branched digestion additive and the second branched digestion additive is a combination of 7 moles of ethyleneoxy groups and 1 mole of a propyleneoxy group such that each m of the branched digestion additive and the second branched digestion additive totals 8, and wherein each B of the branched digestion additive and the second branched digestion additive is a 2-propyl heptanol group.

15. A method as set forth in claim 14 wherein the branched digestion additive is present in an amount of 0.2 weight percent based on a total weight of the composition and the alkaline- or alkaline earth-metal hydroxide is present in amount of from 7 to 9 parts by weight per 100 parts by weight of the caustic composition.

16. A method as set forth in claim 1 wherein each A of the branched digestion additive and the second branched digestion additive is a combination of 9 moles of ethyleneoxy groups and 1 mole of a propyleneoxy group such that each m of the branched digestion additive and the second branched digestion additive totals 10, and wherein each B of the branched digestion additive and the second branched digestion additive is a 2-propyl heptanol group.

17. A method as set forth in claim 16 wherein the branched digestion additive is present in an amount of 0.2 weight percent based on a total weight of the composition and the alkaline- or alkaline earth-metal hydroxide is present in amount of from 7 to 9 parts by weight per 100 parts by weight of the caustic composition.

18. A method as set forth in claim 1 wherein each A of the branched digestion additive and the second branched digestion additive is an ethyleneoxy group, wherein each B of the branched digestion additive and the second branched digestion additive is a tridecyl alcohol group, and wherein each m of the branched digestion additive and the second branched digestion additive is 3.

19. A method as set forth in claim 18 wherein the branched digestion additive is present in an amount of 0.2 weight percent based on a total weight of the composition and the alkaline- or alkaline earth-metal hydroxide is present in amount of from 7 to 9 parts by weight per 100 parts by weight of the caustic composition.

20. A method as set forth in claim 1 wherein each A of the branched digestion additive and the second branched digestion additive is an ethyleneoxy group, wherein each B of the branched digestion additive and the second branched digestion additive is a tridecyl alcohol group, and wherein each m of the branched digestion additive and the second branched digestion additive is 5.

21. A method as set forth in claim 20 wherein the branched digestion additive is present in an amount of 0.2 weight percent based on a total weight of the composition and the alkaline- or alkaline earth-metal hydroxide is present in amount of from 7 to 9 parts by weight per 100 parts by weight of the caustic composition.

\* \* \* \* \*